(12) United States Patent
Horimai et al.

(10) Patent No.: US 9,494,411 B2
(45) Date of Patent: Nov. 15, 2016

(54) THREE-DIMENSIONAL SHAPE MEASURING DEVICE, METHOD FOR ACQUIRING HOLOGRAM IMAGE, AND METHOD FOR MEASURING THREE-DIMENSIONAL SHAPE

(71) Applicant: 3DRAGONS, LLC, Nagoya-shi, Aichi (JP)

(72) Inventors: Hideyoshi Horimai, Nuamzu (JP); Taizo Umezaki, Kasugai (JP)

(73) Assignee: 3DRAGONS, LLC, Aichi (JP)

( * ) Notice: Subject to any disclaimer, the term of this patent is extended or adjusted under 35 U.S.C. 154(b) by 0 days.

(21) Appl. No.: 14/648,740

(22) PCT Filed: Dec. 6, 2013

(86) PCT No.: PCT/JP2013/082790
§ 371 (c)(1),
(2) Date: Jun. 1, 2015

(87) PCT Pub. No.: WO2014/088089
PCT Pub. Date: Jun. 12, 2014

(65) Prior Publication Data
US 2015/0300803 A1   Oct. 22, 2015

(30) Foreign Application Priority Data

Dec. 6, 2012 (JP) ................. 2012-267545

(51) Int. Cl.
*G01B 9/023* (2006.01)
*G01B 9/02* (2006.01)
(Continued)

(52) U.S. Cl.
CPC .......... *G01B 9/023* (2013.01); *G01B 9/02011* (2013.01); *G01B 9/02047* (2013.01);
(Continued)

(58) Field of Classification Search
CPC .................. G01B 9/021; G01B 11/164; G01B 11/2441; G03H 1/00; G03H 1/08
(Continued)

(56) References Cited

U.S. PATENT DOCUMENTS 5,561,525 A    10/1996  Toyonaga et al.
8,860,946 B2 * 10/2014  Nakata ............... G01B 9/02018
                                                              356/493
(Continued)

FOREIGN PATENT DOCUMENTS

JP    5-87541     4/1993
JP    7-12535     1/1995
(Continued)

OTHER PUBLICATIONS

Extended European Search Report EP 13860092.9 (PCT/JP2013/082790) (2015) 7 pages.
(Continued)

*Primary Examiner* — Tarifur Chowdhury
*Assistant Examiner* — Md M Rahman
(74) *Attorney, Agent, or Firm* — AuerbachSchrot LLC; William C. Schrot

(57) ABSTRACT

[Problem] To provide a low-cost, high-precision three-dimensional shape measuring device using vibration-resistant phase shift digital holography.
[Solution] A three-dimensional shape measuring device, wherein an object-light optical system allows object light to be incident on a polarization element for detecting relative phase differences in a first circularly polarized light state, a reference-light optical system allows a reference light to be incident on a polarization element for detecting relative phase differences in a second circularly polarized light state in the direction opposite from the first circularly polarized light, and the polarization element for detecting relative (Continued)

phase differences transmits a component of the object light, which is the first circularly polarized light, in the polarization direction of the polarization element for detecting relative phase differences, and a component of the reference light, which is the second circularly polarized light, in the polarization direction of the polarization element for detecting relative phase differences. The polarization direction of the polarization element for detecting relative phase differences is rotated to thereby vary the relative phase difference between the object light and the reference light transmitted through the polarization element for detecting relative phase differences and to acquire a plurality of hologram images having different relative phase differences.

16 Claims, 16 Drawing Sheets

(51) Int. Cl.
    *G01B 11/24*     (2006.01)
    *G03H 1/00*     (2006.01)
    *G03H 1/04*     (2006.01)

(52) U.S. Cl.
    CPC ....... *G01B 9/02076* (2013.01); *G01B 11/2441* (2013.01); *G03H 1/0443* (2013.01); *G01B 2290/70* (2013.01); *G03H 2001/0033* (2013.01); *G03H 2001/0458* (2013.01); *G03H 2222/31* (2013.01)

(58) Field of Classification Search
    USPC ........................................................ 356/458
    See application file for complete search history.

(56) References Cited

U.S. PATENT DOCUMENTS

| | | | | |
|---|---|---|---|---|
| 2006/0028652 | A1* | 2/2006 | Chan | G01B 11/2441 356/497 |
| 2006/0210911 | A1* | 9/2006 | Yamazoe | G01J 4/04 430/269 |
| 2008/0279061 | A1* | 11/2008 | Ogasawara | G03H 1/04 369/44.37 |
| 2008/0316555 | A1* | 12/2008 | Kaneko | G03H 1/0252 359/3 |
| 2009/0073457 | A1* | 3/2009 | Nakata | G01B 9/02018 356/498 |

FOREIGN PATENT DOCUMENTS

| | | |
|---|---|---|
| JP | 2000-9444 | 1/2000 |
| JP | 2000-329535 | 11/2000 |
| JP | 2002-90110 | 3/2002 |
| JP | 2003-302205 | 10/2003 |
| WO | WO 2012/114947 | 8/2012 |

OTHER PUBLICATIONS

Kiire, T. et al. (2011) "*Three-dimensional Displacement Measurement for Diffuse Object Using Phase-shifting Digital Holography with Polarization Imaging Camera,*" Applied Optics, Optical Society of America, 50(34):H189-H194.

Wyant, J. (2005) "*Going Through a Phase,*" SPIE Newsroom, pp. 20-22.

Patra, A.S. (2005) "*An Investigation of the Two-beam Polarization of a Heterodyne Interferometer,*" J. Optical Tech. 72(12):905-908.

* cited by examiner (A)　　　　　　　　　　(B)

THREE-DIMENSIONAL SHAPE MEASURING DEVICE, METHOD FOR ACQUIRING HOLOGRAM IMAGE, AND METHOD FOR MEASURING THREE-DIMENSIONAL SHAPE

TECHNICAL FIELD

The present invention relates to a technology for measuring a three-dimensional shape, and particularly relates to a three-dimensional shape measuring device using phase shift digital holography, a method for acquiring a hologram image, and a method for measuring a three-dimensional shape.

BACKGROUND ART

Holography is a technology for recording and reproducing a three-dimensional shape of an object and has a step of recording the object shape and a step of reproducing the recorded object shape. A medium recording a three-dimensional shape of an object as interference fringes or a reproduced image is referred to as a hologram. A laser beam with strong coherence is used for recording and reproducing the hologram.

In recent years, a technology of digital holography for acquiring a hologram as a digital image has developed with development of an imaging device. In the digital holography, an imaging device is used instead of a recording medium, but a basic principle is the same as that of the prior-art holography. The digital holography has more merits than the prior-art holography. For example, development processing is not needed, and various types of image processing can be applied to an acquired hologram image. Phase information of object light can be calculated from the hologram image by using light-wave back propagation simulation by a computer or the like, and a three-dimensional shape of an object can be also reproduced with high precision.

However, the resolution (pixel pitch) and the number of pixels of an imaging device are physically limited and are much poorer than those of a recording medium in usual, and thus, depending on the size of a measurement target, a wavelength of the laser beam, and an optical-path length of an entire optical system, zero-order diffracted light and a virtual image might be overlapped with a real image, which extremely deteriorates a reproduced image. In order to solve this problem, a technology of phase shift digital holography for imaging a plurality of hologram images by changing a phase of reference light is proposed (see Patent Literature 1, for example).

Patent Literature 1 describes a device comprising: phase shift means (piezo element) for shifting a phase of reference wave; hologram imaging means for generating a hologram image by irradiation of object wave and the reference wave to an imaging area; a calculating means for executing various processing to the plurality of hologram images generated by the reference wave and the object wave obtained from each of a plurality of phase-shifted reference waves; and the like. According to the description in Patent Literature 1, a device of a phase shift digital holography capable of preventing the reproduced image from accompanying a ghost image without requiring off-axis (crossing angle of reference light and object light) can be provided.

CITATION LIST

Patent Literature

Patent Literature 1: Japanese Unexamined Patent Application Publication No. 1998-268740

SUMMARY OF INVENTION

Technical Problem

The device described in Patent Literature 1 shifts an optical-path difference between the reference light and the object light by a ¼ wavelength by using a mirror including a piezo element as the phase shift means and images four hologram images during the shift for one wavelength. However, precise control of a shift amount is extremely difficult and is also susceptible to vibration. Thus, an optical breadboard, a vibration isolator and the like are needed, which makes the device itself large-sized and complicated and raises a cost. In addition, in the device in Patent Literature 1, the object light is formed by irradiating the measurement target diagonally, and thus, the optical system becomes large, and the size of the device is increased. From these points, the device in Patent Literature 1 cannot be used easily in an actual work site (a factory, a manufacturing line and the like) where a vibration isolation environment is not completely provided.

The present invention was made in view of the above-described problems and has an object to provide a three-dimensional shape measuring device using phase shift digital holography which can solve at least a part of those problems, is inexpensive and highly precise and is resistant against vibration. Another object of the present invention is to provide a three-dimensional shape measuring device using phase shift digital holography with a small and simple configuration.

Solution to Problem

In order to solve the above-described problems, a three-dimensional shape measuring device of the present invention comprises: a laser light source; an object-light optical system; a reference-light optical system reference light; a polarization element for detecting relative phase differences; and imaging means, in which the object-light optical system allows object light generated by irradiating a measurement target with illumination light generated from a part of light irradiated from the laser light source to be incident on the polarization element for detecting relative phase differences in a first circularly polarized light state, the reference-light optical system generates reference light from the other part of the light irradiated from the laser light source and allows the reference light to be incident on the polarization element for detecting relative phase differences in a second circularly polarized light state in a direction opposite to the first circularly polarized light, the polarization element for detecting relative phase differences transmits a component of the object light of the first circularly polarized light in a polarization direction of the polarization element for detecting relative phase differences and a component of the reference light of the second circularly polarized light in the polarization direction of the polarization element for detecting relative phase differences, the imaging means images a hologram image generated by interference between the object light and the reference light transmitted through the polarization element for detecting relative phase differences, and relative phase differences between the object light and the reference light transmitted through the polarization element for detecting relative phase differences are changed by rotating the polarization direction of the polarization element for detecting relative phase differences so that a plurality of the hologram images with different relative phase differences are acquired. Moreover, it is preferable for an optical unit to be configured so that the object-light optical system and the reference-light optical system are integrated.

In the above-described three-dimensional shape measuring device, the optical unit is preferably configured by a combination of a polarization beam splitter, a quarter wave plate, a reflective element. Moreover, the polarization beam splitter has: a first surface on which the light irradiated from the laser light source is incident; a second surface facing the measurement target; a third surface faced with the polarization element for detecting relative phase differences; and a fourth surface faced with the reflective element, in which the quarter wave plate may be provided each on the second surface, the third surface, and the fourth surface. In addition, the polarization beam splitter preferably has an extended portion on one end thereof so that the optical-path length of the reference light becomes substantially equal to the optical-path length of the object light. Moreover, the reflective element may have a surface substantially the same as the shape of the surface of the measurement target. The optical unit may be configured by a holographic optical element.

In the above-described three-dimensional shape measuring device, a telecentric optical system may be provided between the optical unit and the measurement target. The optical unit preferably has diffusing means for diffusing and irradiating a circulatory illumination light to the measurement target. Moreover, the telecentric optical system may be provided between the optical unit and the imaging means.

In the above-described three-dimensional shape measuring device, it is preferable that means capable of image processing is provided, and phase distribution of the object light from the measurement target is calculated from the plurality of hologram images with different relative phase differences so as to reproduce a three-dimensional shape of the measurement target.

A method for acquiring a hologram image of the present invention is characterized in that object light generated by irradiating a measurement target with illumination light generated from a part of light irradiated from the laser light source is converted to a first circularly polarized light, reference light generated from the other part of the light irradiated from the laser light source is converted to a second circularly polarized light in a direction opposite to the first circularly polarized light, the object light of the first circularly polarized light and the reference light of the second circularly polarized light are made incident on a polarization element for detecting relative phase differences which is rotatably configured, a component of the object light of the first circularly polarized light in a polarization direction of the polarization element for detecting relative phase differences and a component of the reference light of the second circularly polarized light in the polarization direction of the polarization element for detecting relative phase differences are transmitted, and a hologram image generated by interference between the object light and the reference light transmitted through the polarization element for detecting relative phase differences is acquired, relative phase differences between the object light and the reference light transmitted through the polarization element for detecting relative phase differences are changed by rotating the polarization direction of the polarization element for detecting relative phase differences, and hologram images with different relative phase differences generated by interference between the object light and the reference light transmitted through the polarization element for detecting relative phase differences are acquired.

In the above-described method for acquiring a hologram image, circulatory illumination light may be generated, and the circulatory illumination light may be diffused and irradiated to the measurement target. Moreover, a telecentric optical system through which at least the object light is transmitted may be arranged so that image information of the measurement target is acquired together with the hologram image. Moreover, when the image information of the measurement target is to be acquired, a light amount of the reference light is preferably lowered as compared with acquirement of the hologram image.

A method for measuring a three-dimensional shape of the present invention is characterized in that phase distribution of object light from the measurement target is calculated from a plurality of hologram images with different relative phase differences acquired by the above-described method of acquiring a hologram image so as to reproduce a three-dimensional shape of the measurement target.

Advantageous Effects of the Invention

According to the present invention, a relative phase difference between the object light and the reference light can be controlled by rotationally driving, in controlled manner, the polarization element for detecting relative phase differences transmitting the object light of the first circularly polarized light and the reference light of the second circularly polarized light in the direction opposite to the first circularly polarized light, and a plurality of hologram images in different phase states can be acquired and thus, a three-dimensional shape measuring device which is inexpensive and highly precise and using digital holography with vibration-resistant relative phase difference detection can be provided. Moreover, a three-dimensional shape measuring device which has a small-sized and simple structure and is more inexpensive and highly precise and resistant against vibration can be provided by integrating the optical unit. The other effects will be described in the description of embodiment.

DESCRIPTION OF EMBODIMENT

[Outline of the Present Invention]

Figure 1:
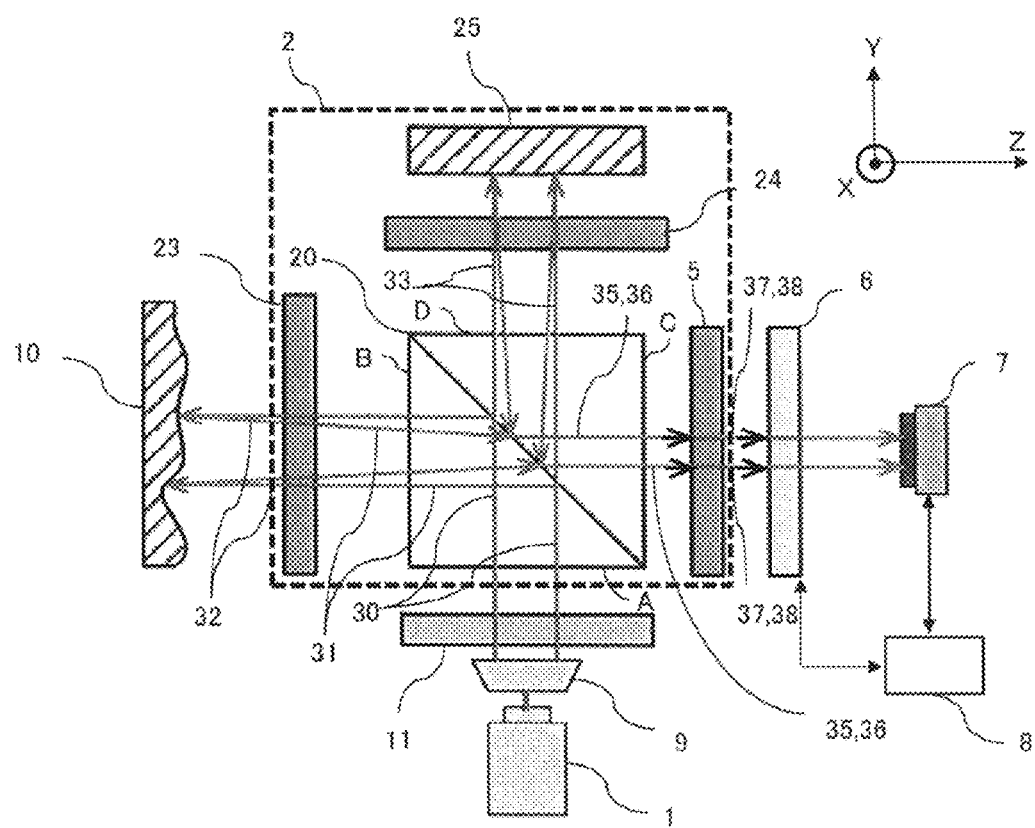
FIG. 1 is an outline configuration view of a three-dimensional shape measuring device according to the present invention.

The present invention is a three-dimensional shape measuring device for measuring a three-dimensional shape of a measurement target by using a phase shift digital holography technology. The inventors have found that, by allowing object light of first circularly polarized light and reference light of second circularly polarized light in a direction opposite to the first circularly polarized light (the same applies to the following) to be incident on a polarization element, linearly polarized light in a polarization-direction component of the polarization element in the object light of the first circularly polarized light and linearly polarized light of the polarization-direction component of the polarization element in the reference light of the second circularly polarized light are transmitted, and a hologram can be imaged by the transmitted object light and reference light. Moreover, the inventors have found that relative phase differences between the object light and the reference light can be controlled in accordance with the polarization direction of the polarization element. Thus, in the present invention, instead of a prior-art method of physically shifting an optical-path difference of the reference light by a mirror including a piezo element, a method of controlling the polarization direction of a polarization element for detecting relative phase differences by using a wave plate for converting the object light and the reference light to circularly polarized light with different rotating directions and the polarization element for detecting relative phase differences is employed as a structure which is simpler and more resistant against vibration. The present invention is a phase shift digital holography technology capable of imaging a plurality of holograms with different relative phase differences between the object light and the reference light by using that. The present invention includes a method for acquiring a hologram image of a measurement target by using such three-dimensional shape measuring device and for measuring the three-dimensional shape of the measurement target.

The three-dimensional shape measuring device of the present invention merely rotationally drives the polarization element for detecting relative phase differences and is more resistant against vibration than the prior-art technology requiring precise control by the unit of a wavelength and does not need to comprise a vibration isolator or the like. It is a low-cost, simple and compact structure, and the device itself can be used while being moved as appropriate. For example, this measuring device can be mounted on a tip end of a robot arm and be sequentially moved to plural spots of a relatively large industrial product so as to measure at a high speed in a factory or the like, for example.

Note that, in this description, for simplification, a direction in light (electromagnetic waves) traveling in one direction in which an electric field vector thereof vibrates is referred to as a polarization direction, and a surface including the electric field vector and the traveling direction is referred to as a polarization plane. When a polarization beam splitter is employed as an optical unit, P-polarized light refers to a component vibrating in a direction parallel with an incident plane, while S-polarized light refers to a component vibrating in a direction perpendicular to the incident plane.

Figure 2:
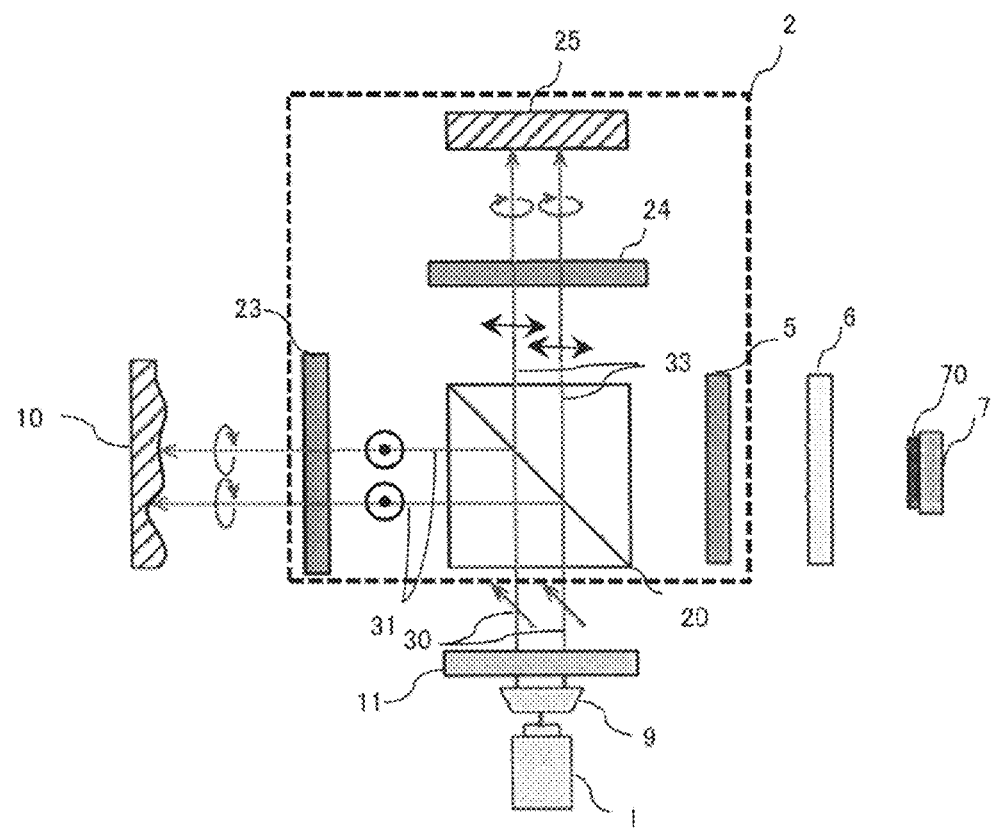
FIG. 2 is an explanatory view illustrating an optical path in laser beam irradiation.
Figure 3:
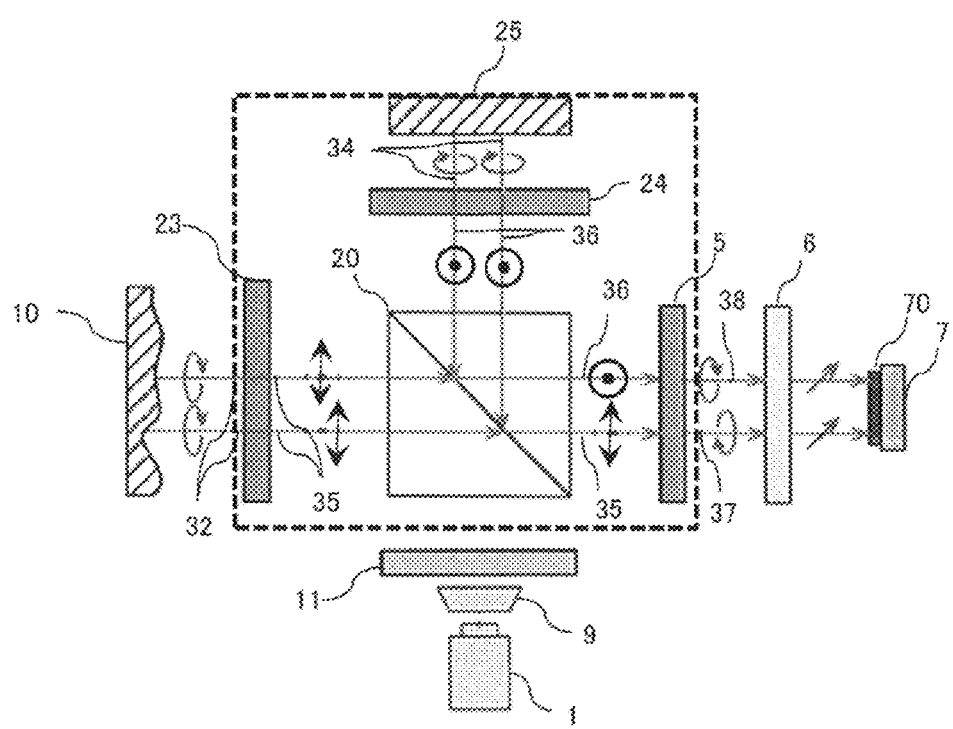
FIG. 3 is an explanatory view illustrating an optical path in laser beam reflection.

The measuring device of the present invention comprises at least: a laser light source (reference numeral 1 in FIGS. 1 to 3, for example. The same applies to the following); an object-light optical system (20, 23, 5) for allowing object light generated by a measurement target (10) to be incident on a polarization element for detecting relative phase differences (6) as first circularly polarized light; a reference-light optical system (20, 24, 25, 5) for allowing reference light to be incident on the polarization element for detecting relative phase differences (6) as second circularly polarized light; the polarization element for detecting relative phase differences (6); and imaging means (7). Note that, in FIGS. 1 to 3, the object-light optical system and the reference-light optical system are realized by an optical unit (2) integrating the both.

The laser light source is a light source capable of supplying a laser beam with strong coherence, and a semiconductor laser (laser diode), a solid laser (ruby laser, YAG laser and the like), a gas laser (He—Ne laser, $CO_2$ laser and the like), a fiber laser and the like can be used. Intensity and a wavelength of the laser beam may be selected as appropriate in accordance with configurations of the measurement target and a measurement optical system and an entire optical-path length.

The object-light optical system is an optical system for generating illumination light for illuminating the measurement target by using a part of light supplied from the laser light source or the like, converting the object light generated by irradiating the measurement target with the illumination light to first circularly polarized light and allowing it to be incident on the polarization element for detecting relative phase differences. In order to generate the illumination light, the light supplied from the laser light source or the like is split by using a polarization beam splitter, and one of linearly polarized light may be used as the illumination light or a part of the light supplied from the laser light source or the like is separated by using the beam splitter and it may be used as the illumination light. Moreover, a quarter wave plate is arranged as appropriate in order to convert the object light to the first circularly polarized light.

The reference-light optical system is an optical system for generating the reference light by using the other part of the light supplied from the laser light source or the like, converting it to second circularly polarized light and allowing it to be incident on the polarization element for detecting relative phase differences. In order to generate the reference light, the light supplied from the laser light source or the like is split by using the polarization beam splitter, and the other of the linearly polarized light may be used as the reference light or the other part of the light obtained by separating the light supplied from the laser light source or the like by using the beam splitter may be used as the reference light. Moreover, the quarter wave plate is arranged as appropriate in order to convert the reference light to the second circularly polarized light.

The object-light optical system and the reference-light optical system are preferably integrated into an optical unit for size reduction, simplification and cost reduction. For the optical unit, a combination of the polarization beam splitter and the wave plate can be used (FIGS. 1 to 3 and FIGS. 8 to 11, for example), or a holographic optical element (hereinafter referred to simply as an "HOE" in some cases) having wavelength selectivity, angle selectivity, and diffraction efficiency set as appropriate can be also used (FIG. 12, for example). However, the configuration illustrated in each figure is only an example and that is not limiting. It is only necessary that the optical unit is configured capable of emitting the object light and the reference light of circularly polarized light with rotating directions opposite to each other toward the polarization element for detecting relative phase differences. The types, arrangement, numbers and the like of various optical elements can be changed in various ways in accordance with the configuration, use purposes and the like of the device. For example, a configuration as an interferometer as described in Japanese Unexamined Patent Application Publication No. 2012-2616 may be also applied.

It is preferable that the object-light optical system and the reference-light optical system allow the object light and the reference light to be incident substantially coaxially on the polarization element for detecting relative phase differences. Here, the term substantially coaxial means that a crossing angle between an optical axis of the object light and an optical axis of the reference light is zero or sufficiently small (approximately 0 to ±7°). As described above, in the three-dimensional shape measurement by digital holography, since the resolution and the number of pixels of the imaging device are limited, it is preferable that the crossing angle between the object light from the measurement target and the reference light is made as small as possible, and an interval between the interference fringes is made large.

The polarization element for detecting relative phase differences is arranged perpendicularly to the optical axis of the object light or the reference light and is configured capable of changing the polarization direction. For example, the polarization element for detecting relative phase differences can employ a configuration using a linear polarization element and rotary drive means so that the polarization element can be rotated around the optical axis of the object light or the reference light. Moreover, the rotary drive means is capable of imaging a hologram obtained by relative phase difference detection at a high speed by rotating the polarization element at a predetermined rotation speed in synchronization with imaging timing by the imaging means (see FIG. 5). Here, an angle between a reference axis (the X-axis, for example) when the polarization element for detecting relative phase differences is arranged and a polarization axis (polarization direction) of the linear polarization element is referred to as a rotation angle $\alpha$ (see FIG. 5). However, the rotary drive means may be configured capable of changing only a specific rotation angle gradually.

The polarization element for detecting relative phase differences transmits at least a part (linear components corresponding to the polarization axis) of the first circularly polarized light and the second circularly polarized light. In the object light and the reference light of the circularly polarized light rotating in directions opposite to each other, the parts (linear components) of the object light and the reference light that can be transmitted at the rotation angle $\alpha$ at certain time have different phases. Then, when the polarization element is rotated, a relative phase difference between the part of the object light and the part of the reference light transmitted changes in accordance with a change amount of the rotation angle $\alpha$. Thus, in the present invention, the relative phase difference between the object light and the reference light can be changed by simple rotation control of the polarization element without changing an optical path of the reference light by using a piezo element or the like.

The imaging means images a hologram image (hereinafter referred to as an interference fringe pattern in some cases) generated on the imaging area by interference between the object light (portion transmitted through the polarization element for detecting relative phase differences) and the reference light (portion transmitted through the polarization element for detecting relative phase differences) with a relative phase difference generated. As the imaging means, a CMOS (Complementary Metal-oxide Semiconductor) sensor, a CCD (Charge Coupled Device) sensor and the like can be used, for example.

Moreover, the present invention may include information processing means. The information processing means can control operation of the rotary drive means of the polarization element for detecting relative phase differences, an imaging timing of the imaging means and the like. Moreover, in the three-dimensional shape measurement, it is configured that various types of processing are executed to the hologram image acquired by the imaging means. Specific processing of the three-dimensional shape measurement will be described later using FIG. 6. The information processing means can use a personal computer, a server and the like, for example. Moreover, it may be configured by a processer and its peripheral circuit so that various types of processing can be realized by making hardware and a program cooperate with each other. Moreover, an exclusive circuit for image calculation may be used. For example, software for various types of processing may be embedded in FPGA (Field-Programmable Gate Array) arranged inside the imaging means.

As described above, according to the measuring device of the present invention, by rotating the polarization element for detecting relative phase differences, relative phase differences between a part of the object light which is the first circularly polarized light and a part of the reference light which is the second circularly polarized light can be controlled, and a plurality of hologram images with different relative phase differences can be acquired.

Embodiments of the present invention will be described below by referring to the attached drawings. However, the present invention is not limited to embodiments below.

[Device Configuration]

FIG. 1 is an outline configuration view of a three-dimensional measuring device of an embodiment of the present invention, FIG. 2 is an explanatory view illustrating an optical path in laser beam irradiation, and FIG. 3 is an explanatory view illustrating an optical path in laser beam reflection. Note that, in FIG. 1, in order to illustrate the optical paths in the laser beam irradiation and the laser beam reflection at once, the optical path in reflection is shown with an angle to that in irradiation, but the optical axes in irradiation and reflection are basically the same, and the optical paths are overlapped with each other by ignoring micro irregularity on the surface of reflecting means or a shape of the measurement target.

The measuring device comprises a laser light source 1, an optical unit 2, a polarization element 6 for detecting relative phase differences (including rotary drive means (not shown)), and imaging means 7. Moreover, the measuring device may comprise information processing means 8, a beam expander 9, a half wave plate 11 for incident light and the like.

The optical unit 2 in FIG. 1 includes a polarization beam splitter 20, a quarter wave plate 23 for illumination light, a quarter wave plate 24 for reference light, and a reflective element 25, and a quarter wave plate 5 for circularly polarized light conversion. Moreover, in FIG. 1, the beam expander 9 and the half wave plate 11 for incident light are provided between the laser light source 1 and the optical unit 2. The optical unit 2 generates illumination light 31 and reference light 33 from light supplied from the laser light source 1 and finally emits object light 37 of first circularly polarized light and reference light 38 of second circularly polarized light with rotating directions opposite to each other substantially coaxially toward the polarization element 6 for detecting relative phase differences. In the polarization beam splitter in FIG. 1, the laser light source 1 is arranged on a side of a first surface A on which laser beam 30 irradiated from the laser light source 1 is incident. On a side of a second surface B, a measurement target is arranged, and the quarter wave plate 23 for illumination light is provided on the surface B or its vicinity. On a side of a third surface C, the polarization element 6 for detecting relative phase differences and imaging means 7 are arranged, and the quarter wave plate 5 for circularly polarized light conversion is provided on the surface C or it vicinity. On a fourth surface D or its vicinity, the quarter wave plate 24 for reference light and the reflective element 25 are provided.

By referring to FIG. 2, first, the laser beam irradiated from the laser light source 1 is enlarged to parallel light having a predetermined beam diameter by the beam expander 9 and is incident on the polarization beam splitter 20. The beam expander 9 is an optical component for enlarging a beam diameter of a laser beam in parallel and includes a collimator lens and the like. In this case, the laser beam emitted from the beam expander 9 is linearly polarized light, but after this linearly polarized light is transmitted through the half wave plate 11, linearly polarized light 30 having a specific polarization direction is formed, and by combining it with the polarization beam splitter 20, an intensity ratio between the irradiation light and the reference light can be adjusted. For example, by setting an optical axis of the half wave plate 11 so that the polarization direction of the linearly polarized light 20 forms 45° to an incident surface of the polarization beam splitter 20, an intensity of amplitude of first linearly polarized light split by the polarization beam splitter 20 and an intensity of amplitude of second linearly polarized light become substantially equal.

The polarization beam splitter 20, with its optical characteristics, splits the linearly polarized light 30 into two luminous fluxes of the first linearly polarized light (hereinafter referred to as S-polarized light) and the second linearly polarized light (hereinafter referred to as P-polarized light) and causes one of which (the S-polarized light, for example) to be reflected on a boundary surface of a medium, while the other (the P-polarized light, for example) is transmitted. Here, the S-polarized light is used as the illumination light 31, while the P-polarized light is used as the reference light 33, but the arrangement may be opposite. In this case, arrangement of the quarter wave plate 23 for illumination light, the quarter wave plate 24 for reference light, the reflective element 25, and the measurement target 10 is set as appropriate.

The illumination light 31 which is the S-polarized light is converted to circularly polarized light (left rotation, for example) after it is transmitted through the quarter wave plate 23 for illumination light and is irradiated to the measurement target 10. On the other hand, the reference light 33 which is the P-polarized light is converted to circularly polarized light with the rotating direction opposite to that of the illumination light 31 (right rotation, for example) after it is transmitted through the quarter wave plate 24 for reference light and is reflected by the reflective element 25. As the reflective element 25, a planar mirror, a reflection-type HOE and the like can be used. If a rough shape of the measurement target is known in advance (spherical surface, for example), a convex mirror, a concave mirror or a combination of them or a reflection-type HOE in which their shapes are recorded as phase information and the like can be also used. If a shape of the measurement target is determined in advance as in a test in a product manufacture line, a reflection surface having the shape substantially the same as the shape of the measurement target is preferably provided. For example, in a test of a lens shape, extremely accurate measurement of an aspherical shape is required and thus, by arranging a reflective element having substantially the same shape as that of the lens in advance, small and uniform phase difference distribution can be obtained over the whole surface for the phase difference from the reflective element having the substantially the same shape, whereby measurement with extremely high accuracy can be realized. Particularly, it is preferably applied to a test of an optical component such as a fly eye lens in which a plurality of lenses are combined.

By referring to FIG. 3, object light 32 (left circularly polarized light) generated by reflection of the illumination light 31 by the measurement target 10 is transmitted through the quarter wave plate 23 for illumination light again and thus, it is converted to the P-polarized light orthogonal to the S-polarized light of the illumination light. The object light of the P-polarized light is transmitted through the polarization beam splitter 20 and is emitted toward the quarter wave plate 5 for circularly polarized light conversion. On the other hand, the reference light 34 (right circularly polarized light) reflected from the reflective element 25 is transmitted through the quarter wave plate 24 for reference light and thus, it is converted to the S-polarized light orthogonal to the P-polarized light in irradiation. The reference light 36 of the S-polarized light is reflected by the polarization beam splitter 20 and is emitted toward the quarter wave plate 5 for circularly polarized light conversion.

Subsequently, the object light 35 of the P-polarized light and the reference light 36 of the S-polarized light emitted from the polarized beam splitter 20 are transmitted through the quarter wave plate 5 for circularly polarized light conversion. The quarter wave plate 5 for circularly polarized light conversion is arranged on an emitting side of the optical unit 2 and coverts one of the object light and the reference light which are linearly polarized light orthogonal to each other to the circularly polarized light in the first rotating direction (left rotation, for example. See an electric field vector $E_1$ in FIG. 4) and the other is converted to the circularly polarized light in the second rotating direction (right rotation, for example. See an electric field vector $E_2$ in FIG. 4). Thus, when the object light 35 of the P-polarized light is transmitted through the quarter wave plate 5, it is converted to the object light 37 of the circularly polarized light in the first rotating direction (right rotation, for example). On the other hand, when the reference light 36 of the S-polarized light is transmitted through the quarter wave plate 5 for circularly polarized light conversion, it is converted to the reference light 38 of the circularly polarized light in the second rotating direction (left rotation, for example).

Figure 4:
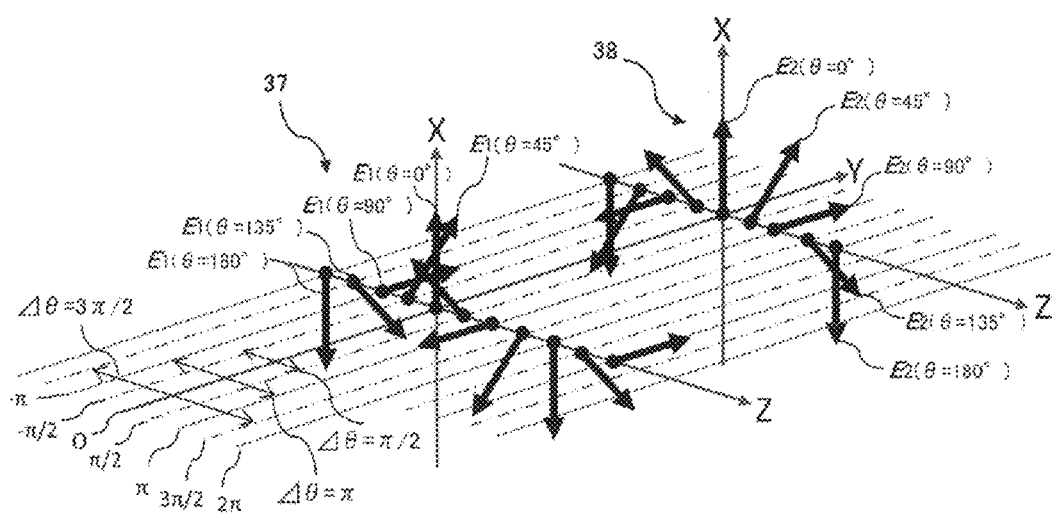
FIG. 4 is an explanatory view illustrating states of circularly polarized light of object light and reference light.

FIG. 4 is an explanatory view illustrating states of circularly polarized light of object light and reference light. The circularly polarized light can be expressed as a trajectory of a tip end of the electric field vector E advancing while rotating around an axis in the traveling direction (Z-axis, here) in general. Here, regarding the rotating direction of the electric field vector E, clockwise with respect to the traveling direction (directed to the +Z-axis direction) is assumed to be right rotation, and counterclockwise to be left rotation. An angle between an X-Z plane which is a reference plane and a polarization plane including the electric field vector E (including the polarization direction) is assumed to be a polarization angle θ of circularly polarized light.

The P-polarized light and the S-polarized light are transmitted through the quarter wave plate 5 for circularly polarized light conversion and then, become circularly polarized light with rotating directions different from each other as illustrated. If the electric field vector $E_1$ (directed to the +X-direction based on a position of Z=0) of right circularly polarized light (object light 37) rotates only by a half cycle in right rotation, the phase is reversed (directed to the −X-axis direction), and if it rotates by another half cycle, the phase returns to the same phase. Similarly, if the electric field vector $E_2$ (directed to the +X-direction based on a position of Z=0) of left circularly polarized light (reference light 38) rotates only by a half cycle in left rotation, the phase is reversed (directed to the −X-axis direction), and if it rotates by another half cycle, the phase returns to the same phase. Note that, in the figure, the phase difference between the right circularly polarized light 37 and the left circularly polarized light 38 at reference (Z=0) is assumed to be zero for simplification, but actually it has an initial phase difference Δφ.

After that, the object light 37 of the right circularly polarized light and the reference light 38 of the left circulatory polarized light emitted from the optical unit 2 is incident on the polarization element 6 for detecting relative phase differences and then, components of parts of the right circularly polarized light 37 and the left circularly polarized light 38 corresponding to its polarization axis are transmitted, and an interference fringe pattern is formed on an imaging area 70 of the imaging means 7 by the object light and the reference light having the same polarization axis. For explanation, the object light 37 and the reference light 38 are illustrated separately, but both are preferably emitted substantially coaxially.

Figure 5:
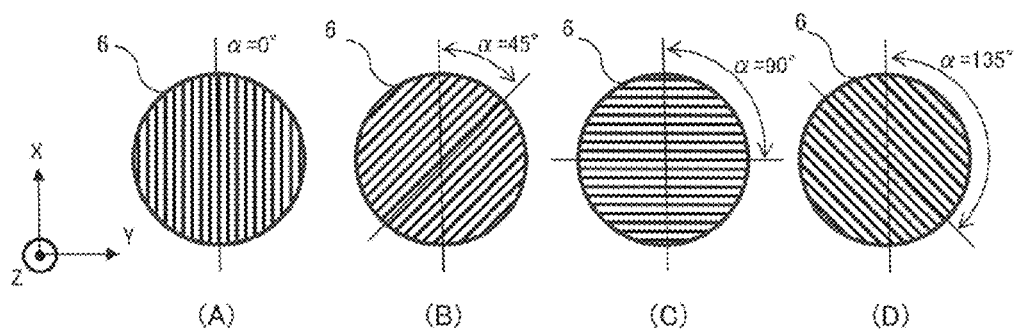
FIG. 5 is an explanatory view illustrating an operation of the polarization element for detecting relative phase differences.

FIG. 5 is an explanatory view illustrating operation of the polarization element for detecting relative phase differences. The polarization element 6 for detecting relative phase differences is an optical component having a polarization axis transmitting only light in a specific polarization direction and is configured rotatably. The polarization element 6 for detecting relative phase differences is arranged substantially perpendicularly to the optical axes of the object light 37 and the reference light 38. The rotation angle α is an angle between a reference axis (X-axis) and the polarization axis when the polarization element 6 for detecting relative phase differences is arranged. When the polarization element 6 for detecting relative phase differences is rotated only by a half cycle, the polarization axis matches with the reference axis again.

The polarization element 6 for detecting relative phase differences is preferably rotated continuously at a constant rotation speed. In this case, the information processing means 8 may control imaging timing of the imaging means 7 in synchronization with a signal indicating a rotation angle from the rotary drive means, for example. Specifically, it is preferable that, when the rotation angle is shifted by 45° each (that is, α=0°, 45°, 90°, and 135°), hologram images are preferably imaged at each of the imaging timing. As a result, while the polarization element 6 for detecting relative phase differences rotates by a half cycle, a hologram image including four types of phase information can be acquired. Moreover, that is not limiting, and the polarization element 6 for detecting relative phase differences may be controlled so as to rotate gradually by a predetermined angle each at every predetermined time interval.

The rotation speed, imaging timing (rotation angle) and the like can be set as appropriate in accordance with a configuration of a measuring device. For example, by setting the rotation speed of the polarization element 6 for detecting relative phase differences to 7.5 rps (7.5 rotations/second) and a framerate in imaging by the imaging means (CCD camera) to 60 fps (60 frames/second), 4×15 hologram images per second can be picked up.

FIGS. 5A, 5B, 5C, and 5D show states in which the rotation angle α=0°, 45°, 90°, and 135°, respectively. If the polarization element 6 for detecting relative phase differences rotates another 45° (α=180°), it returns to the state in FIG. 5A.

In the following, too, explanation will be made assuming that the initial phase difference Δφ is zero for simplification. If the state of the polarization element 6 for detecting relative phase differences is in the state of FIG. 5A (α=0°), in each circularly polarized light in FIG. 4, components corresponding to the polarization angle θ=0° and 180° in the circularly polarized light are transmitted. In this case, the relative phase difference between $E_1$ (θ=0°) of the right circularly polarized light 37 (object light) and the $E_2$ (θ=0°) of the left circularly polarized light 38 (reference light) match at Δθ=0, which is the same phase. That is, since the reference light and the object light are enhanced to each other at the same timing, the interference fringe pattern becomes strong.

In the case of FIG. 5B (α=45°), components corresponding to the polarization angles θ=45° and 225° in the circularly polarized light are transmitted. Here, as compared with a position (π/4) of $E_2$ (θ=45°) of the left circularly polarized light 38 (reference light) in FIG. 4, a position (−π/4) of $E_1$ (θ=45°) of the right circularly polarized light 37 (object light) is delayed only by π/2. That is, the relative phase difference between the reference light and the object light is π/2, which corresponds to a quarter wavelength of incident light.

In the case of FIG. 5C (α=90°), components corresponding to the polarization angles θ=90° and 270° are transmitted. Here, as compared with a position (π/2) of $E_2$ (θ=90°) of the left circularly polarized light 38 (reference light) in FIG. 4, a position (−π/2) of $E_1$ (θ=90°) of the right circularly polarized light 37 (object light) is delayed only by π. That is, the relative phase difference between the reference light and the object light is π, which corresponds to a half wavelength of incident light. Since the reference light and the object light weaken each other at the same timing, the interference fringe pattern becomes weakened.

In the case of FIG. 5D (α=135°), components corresponding to the polarization angles θ=135° and 315° are transmitted. Here, as compared with a position (3π/4) of $E_2$ (θ=135°) of the left circularly polarized light 38 (reference light) in FIG. 4, a position (−3π/4) of $E_1$ (θ=135°) of the right circularly polarized light 37 (object light) is delayed only by 3π/2. That is, the relative phase difference between the reference light and the object light is 3π/2, which corresponds to three quarters wavelength of incident light.

As described above, according to this measuring device, by rotating the polarization element for detecting relative phase differences by 45° each, four different relative phase differences can be provided between the reference light and the object light. As a result, the hologram images in the four states with different relative differences can be imaged. Moreover, since the piezo element does not have to be used, the measuring device which is not influenced by vibration but has a small-sized and simple structure can be configured. Note that, in the description above, the hologram images including four types of phase information when the rotation angle is shifted by 45° each are acquired, but hologram images including a large number of types of phase information may be acquired at smaller rotation angles, and a large number of hologram images whose phase information changes continuously can be also acquired. By using a large number of hologram images (interference patterns), an information amount that can be used for calculation of the (initial) phase difference Δϕ in the equation (2) which will be described later increases, and thus, calculation accuracy of Δϕ becomes higher, and improvement of measurement accuracy can be realized. Moreover, by acquiring continuous phase information, the initial phase difference can be directly acquired from a sinusoidal wave included in contrast information of the interference fringes without using the equation (2).

[Processing of Three-Dimensional Shape Measurement]

Processing of the three-dimensional shape measurement based on the imaged four types of hologram images will be described below.

Figure 6:
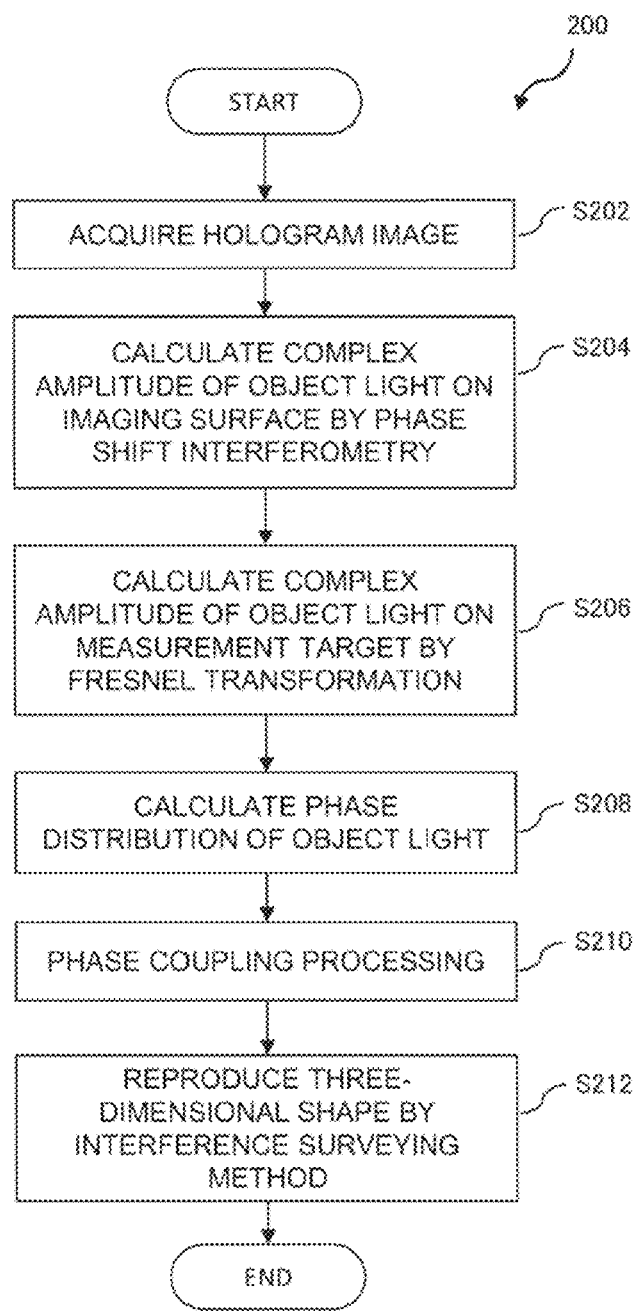
FIG. 6 is a flowchart illustrating an outline of the processing of the three-dimensional shape measurement.
Figure 7:
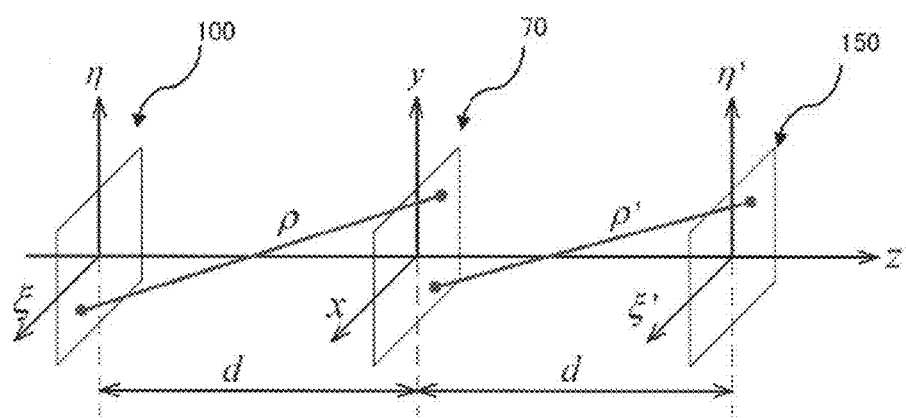
FIG. 7 is an explanatory view illustrating a relation between a measurement target area and the imaging area.

FIG. 6 is a flowchart illustrating an outline of the processing of the three-dimensional shape measurement. FIG. 7 is an explanatory view illustrating a coordinate system of a measurement target area and the imaging area. The traveling direction of the reference light and the object light are assumed to be z. Coordinates (x, y) are those of the imaging area 70, coordinates (ξ, η) are those of the measurement target area 100, and coordinates (ξ', η') are those of an image plane 150. A distance between the imaging area 70 and a measurement target area 100 and a distance between the imaging area 70 and the image plane 150 are assumed to be d.

First, the information processing means 8 acquires a hologram image imaged by the imaging means 7 (S202). Interference fringe pattern $I_n$ (x, y) (n=1, 2, 3, 4) of imaged four types of hologram images can be expressed by the equation (1-1) to the equation (1-4) as sinusoidal patterns according to the interference theory. Reference characters n=1, 2, 3, 4 correspond sequentially to the cases of the relative phase differences Δθ=0, π/2, π, 3π/2.

[Equation 1]

$$I_1(x, y) = B(x, y) + C(x, y)\cos(\Delta\varphi) \quad (1\text{-}1)$$

$$I_2(x, y) = B(x, y) + C(x, y)\cos\left(\Delta\varphi + \frac{\pi}{4}\right) \quad (1\text{-}2)$$

$$I_3(x, y) = B(x, y) + C(x, y)\cos\left(\Delta\varphi + \frac{\pi}{2}\right) \quad (1\text{-}3)$$

$$I_4(x, y) = B(x, y) + C(x, y)\cos\left(\Delta\varphi + \frac{3\pi}{4}\right) \quad (1\text{-}4)$$

Here, B (x, y) is an offset of a linear components (average value) of the interference fringes (sinusoidal waves), and C(x, y) is amplitude of the interference fringes. Reference character Δϕ denotes an initial phase difference (phase difference when the polarization angle θ=0 in each light) between the reference light and the object light on the imaging area. In order to accurately calculate the initial phase difference Δϕ, B(x, y) and C(x, y) need to be calculated, but since B(x, y) and C(x, y) are unknown, it is impossible to calculate the initial phase difference Δϕ only by one interference fringe pattern. In the present invention, since at least four types of interference fringe patterns can be acquired, the initial phase difference Δϕ can be calculated as in the equation (2) by using the four types of interference fringe patterns with different relative phase differences.

[Equation 2]

$$\Delta\varphi = \arctan\frac{I_4 - I_2}{I_1 - I_3} \quad (2)$$

Subsequently, the information processing means 8 calculates complex amplitude $E_0$ (x, y) of the object light on the imaging area 70 by the Phase Shift Interferometry (PSI) (S204). The complex amplitude $E_0$ (x, y) of the object light can be expressed as in the equation (3).

[Equation 3]

$$Eo(x,y)=A(x,y)\exp(i\Delta\phi) \quad (3)$$

Here, A (x, y) expresses intensity of the object light reaching the imaging area from the measurement target (superposition of interference fringe patterns $I_1$ to $I_4$), and Δ100 expresses the phase difference between the object light and the reference light on the imaging area 70. Assuming that a phase value of the reference light is 0, Δϕ is a phase value (relative phase) of the object light on the imaging area 70 based on the phase value of the reference light. Thus, $E_0$ (x, y) expressed in the equation (3) corresponds to the object light on the imaging area 70. However, actually the phase value of the reference light is unknown. This uncertainty of the reference light is considered to give an undesired influence on a measurement result. As a result, in order to calculate the phase value of the object light most accurately, the phase value of the object light on the measurement target area needs to be calculated by using Fresnel transformation.

The information processing means 8 can calculated the object light Γ(ξ, η) on the measurement target area 100 by Fresnel transformation on the basis of the equations (4-1) and (4-2) (S206). Reference character λ denotes a wavelength of a laser beam.

[Equation 4]

$$Eo(x, y) = \frac{i}{\lambda} \int_{-\infty}^{\infty} \int_{-\infty}^{\infty} \Gamma(\xi, \eta) \frac{\exp\left(-i\frac{2\pi}{\lambda}\rho\right)}{\rho} d\xi d\eta \quad (4\text{-}1)$$

$$\rho = \sqrt{(x-\xi)^2 + (y-\eta)^2 + d^2} \quad (4\text{-}2)$$

Here, in a prior-art method, first, the equation (7-1) including $E_0 (x, y)$ is used to calculate regenerated light $\Gamma(\xi', \eta')$ diffracted from the imaging area 70 to the image plane 150 by Fresnel transformation. Moreover, in the prior-art method, when the regenerated light $\Gamma(\xi', \eta')$ indicated in the equation (7-1) is calculated, the regenerated light is approximated by Taylor expansion of $\rho'$ indicated in the equation (7-2) for simplification of an algorithm of Fresnel transformation. However, the calculated regenerated light $\Gamma(\xi', \eta')$ might contain a large calculation error due to that, which might give an undesired influence on measurement accuracy. In addition, as expressed in the equation (7-2), due to variation in the diffraction distance d of the regenerated light (distance between the imaging area 70 and the regenerated image plane 150 set in calculation), the phase of the calculated regenerated light $\Gamma(\xi', \eta')$ might be varied. Thus, in the prior-art method, a value of d optimal for measurement needs to be examined in order to improve measurement accuracy.

In the present invention, in order to improve these problems, instead of Taylor expansion of $\rho'$ indicated in the equation (4-2), first, the equation (5-1) is used to directly calculate the object light $\Gamma(\xi, \eta)$ on the measurement target area 100 by using Fast Fourier Transform (FFT) (S206). Note that a function g ($\xi$, $\eta$, x, y) in the equation (5-1) corresponds to the equation (5-3).

As a result, the present invention can reduce calculation errors as compared with the prior-art method and can realize measurement with high accuracy. Moreover, since the complex amplitude $\Gamma(\xi, \eta)$ of the object light on the measurement target area 100 is directly calculated, there is no actual object light at a position farther than the distance d between the imaging area 70 and the measurement target area 100, and the phase of the regenerated light is not varied. As a result, examination of the diffraction distance d of the regenerated light can be easily realized.

Note that, when the object light $\Gamma(\xi, \eta)$ is calculated, Fast Fourier Transform (FFT) is used, but in order to realize high-speed calculation, appropriate sampling instead of using all the information (pixels) is preferable. However, in the present invention, in order to realize three-dimensional measurement with high resolution, all the information (pixels) is used. That is, the number of samplings on the x-axis is equal to the number of pixels in a width direction of the hologram image, and the number of samplings on the y-axis is equal to the number of pixels in a height direction.

Subsequently, the information processing means 8 calculates phase distribution $\phi(\xi, \eta)$ of the object light $\Gamma(\xi, \eta)$ indicated in the equation (5-2) (S208). Note that, the phase distribution $\phi$ is the phase of the object light $\Gamma(\xi, \eta)$ on the measurement target area 100 and is the phase value (absolute phase) not based on the phase value of the reference light.

[Equation 5]

$$\Gamma(\xi, \eta) = F^{-1}\left\{\frac{F(Eo(x, y))}{F(g(\xi, \eta, x, y))}\right\} \quad (5\text{-}1)$$

$$\varphi(\xi, \eta) = \arctan\frac{\text{Im}\{\Gamma(\xi, \eta)\}}{\text{Re}\{\Gamma(\xi, \eta)\}} \quad (5\text{-}2)$$

$$g(\xi, \eta, x, y) = \frac{\exp\left(-i\frac{2\pi}{\lambda}\sqrt{(x-\xi)^2 + (y-\eta)^2 + d^2}\right)}{\sqrt{(x-\xi)^2 + (y-\eta)^2 + d^2}} \quad (5\text{-}3)$$

Since the phase distribution $\phi(\xi, \eta)$ calculated by the equation (5-2) changes in a section of $[-\pi, \pi]$, phase coupling processing needs to be executed. Thus, the information processing means 8 executes phase coupling processing by using the Quality Map method or the like, for example (S210).

The Quality Map method is described in "Yuri Barseghyan Hakob Sarukhanyan, Laplacian Based LF Quality Map for Phase Reconstruction, CSIT 2009". The Quality Map method is to calculate a phase difference between the reference light and the measurement light at each point on the imaging area by measuring an intensity change of the interference fringes when a certain phase difference is given between the reference light and the object light.

Lastly, the information processing means 8 calculates a shape of the measurement target (three-dimensional world coordinates (X, Y, Z)) by using an interference surveying method or the like (S212). The interference surveying method is described in "Isaevich Ostrovski, Interferometry by Holography (Springer series in optical sciences), July 1980, Springer-Verlag, New York". The interference surveying method is a method for measuring a three-dimensional shape of an object using a fact that, if a phase value of light changes only by an integer times of $2\pi$, the shape of the measurement target changes only by a wavelength of the same times.

In the present invention, a coordinate value on the Z-axis of the three-dimensional shape of the measurement target is calculated from continuous phase values by using the equation (6-3) according to the above-described interference surveying method. Subsequently, coordinate values of the X-axis and the Y-axis of the three-dimensional shape are calculated by using the equations (6-1) and (6-2) from a correspondence relation between coordinates of the x-axis as well as the y-axis of the imaging area 70 indicated in the equation (5-3) and coordinates of a $\xi$-axis as well as a $\eta$-axis of the measurement target area.

[Equation 6]

$$X = \frac{\lambda d}{N\Delta x}x \quad (6\text{-}1)$$

$$Y = \frac{\lambda d}{N\Delta y}y \quad (6\text{-}2)$$

$$Z = \varphi\frac{\lambda}{2\pi} \quad (6\text{-}3)$$

$\Delta x$ and $\Delta y$ are distances in lateral and vertical directions between pixels of a camera sensor element such as a CCD, a CMOS and the like, and N is the number of samplings. Reference character $\phi$ denotes phase distribution of the object light after the coupling processing. By means of the processing as above, the three-dimensional shape of the measurement target can be measured.

[Equation 7]

$$\Gamma(\xi', \eta') = \frac{i}{\lambda} \int_{-\infty}^{\infty} \int_{-\infty}^{\infty} Eo(x, y) \frac{\exp\left(-i\frac{2\pi}{\lambda}\rho'\right)}{\rho'} dx dy \quad (7\text{-}1)$$

$$\rho' = \sqrt{(x - \xi')^2 + (y - \eta')^2 + d^2} \quad (7\text{-}2)$$

[Variation of Device Configuration]

Figure 8:
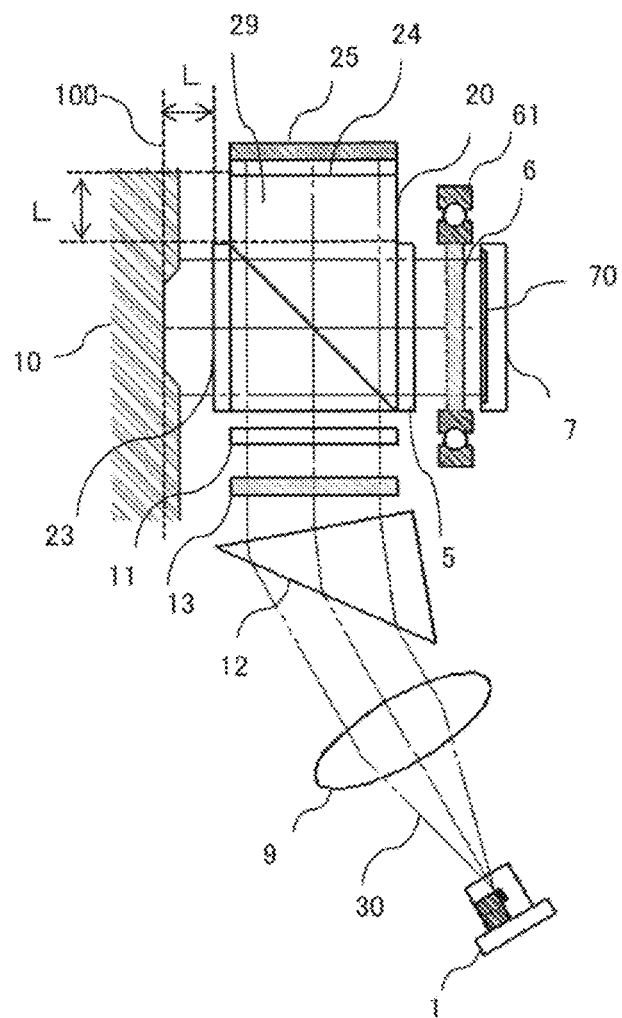
FIG. 8 is a first variation of the three-dimensional shape measuring device according to the present invention.

FIG. 8 is a first variation of this measuring device. The device illustrated in the figure is different from the device illustrated in FIG. 1 in a point that a collimator lens 9, an anamorphic prism 12, and a polarization element 13 for light-amount adjustment are provided. Moreover, in FIG. 8, rotary drive means 61 for rotating the polarization element 6 for detecting relative phase differences is also illustrated. In FIG. 8, the polarization element 13 for light-amount adjustment and the half wave plate 11 for incident light are preferably configured rotatably around an optical axis of the incident light. Note that, arrangement of the polarization element 13 for light-amount adjustment and the half wave plate 11 for incident light may be switched to each other. The same reference numerals are given to the same configurations as those illustrated in FIG. 1, and explanation will be omitted. In this variation, a zoom optical system or the like is not provided in a space from the measurement target, but measurement is assumed to be based on the actual and thus, it is suitable for applications for measuring a relatively small measurement target (approximate the same as the size of the imaging area and the diameter of approximately 10 to 20 mm).

In this variation, the optical-path lengths of the reference light and the object light are set to be approximately equal and thus, a semiconductor laser with a short coherent length can be also used as a laser light source. Since the semiconductor laser 1 has a coherent length shorter than that of a solid laser and the like, an optical-path length difference between the reference light and the object light (including the illumination light) is preferably made as small as possible in order to acquire an appropriate interference fringe pattern. In this variation, an extended portion 29 corresponding to a distance L for which the illumination light emitted from the polarization beam splitter reaches the measurement target area is provided on one end of the polarization beam splitter corresponding to an optical path over which the reference light reciprocates. Depending on a surface shape (irregularity) of the measurement target, an optical-path length difference may be generated between the object light and the reference light, but if a normal single mode is used in the semiconductor laser, an optical-path length difference of approximately 1 to 10 mm can be allowed. Note that, when a semiconductor laser with a small spectral line width (DFB (Distributed Feedback) laser, for example) is used, though it is relatively expensive, a much larger optical length path can be allowed.

A laser beam 30 irradiated from the semiconductor laser 1 becomes parallel light through the collimate lens 9. Sectional intensity distribution of the beam is preferably made substantially circular by the anamorphic prism 12. The circularly formed laser beam has linearly polarized light in a specific direction.

The polarization element 13 for light-amount adjustment is configured such that its transmission axis is rotatable around the optical axis of the incident light and as a result, it can transmit the linearly polarized light in the specific direction and adjust the incident light amount. Moreover, an extinction ratio of the linearly polarized light of the laser beam from the laser light source can be improved, and the linearly polarized light with a higher quality can be obtained. The half wave plate 11 for incident light is configured such that its optical axis is rotatable around the optical axis of the incident light. With the half wave plate 11, the polarization direction of the incident light can be varied only by twice of the angle with the optical axis. Thus, by setting the direction of the optical axis as appropriate, the polarization direction of the incident light incident on the polarization beam splitter can be set as appropriate and thus, a ratio of the light amounts between the S-polarized light (illumination light) reflected by the boundary surface and the P-polarized light (reference light) transmitted through the boundary surface can be changed arbitrarily. Therefore, such a ratio can be optimized in accordance with modes (transmission, full-reflection) of the measurement target, and an appropriate interference fringe pattern can be acquired.

Moreover, the quarter wave plate 23, the quarter wave plate 24, and the reflective element 25 are preferably provided in close contact with each surface of the polarization beam splitter 20. Moreover, the quarter wave plate 5 is also preferably provided in close contact with the emitting surface of the polarization beam splitter 20. As a result, the size of the optical unit can be reduced. Moreover, stray light caused by reflection, scattering and the like on the surface of the optical element can be suppressed, and a noise can be reduced.

Figure 9:
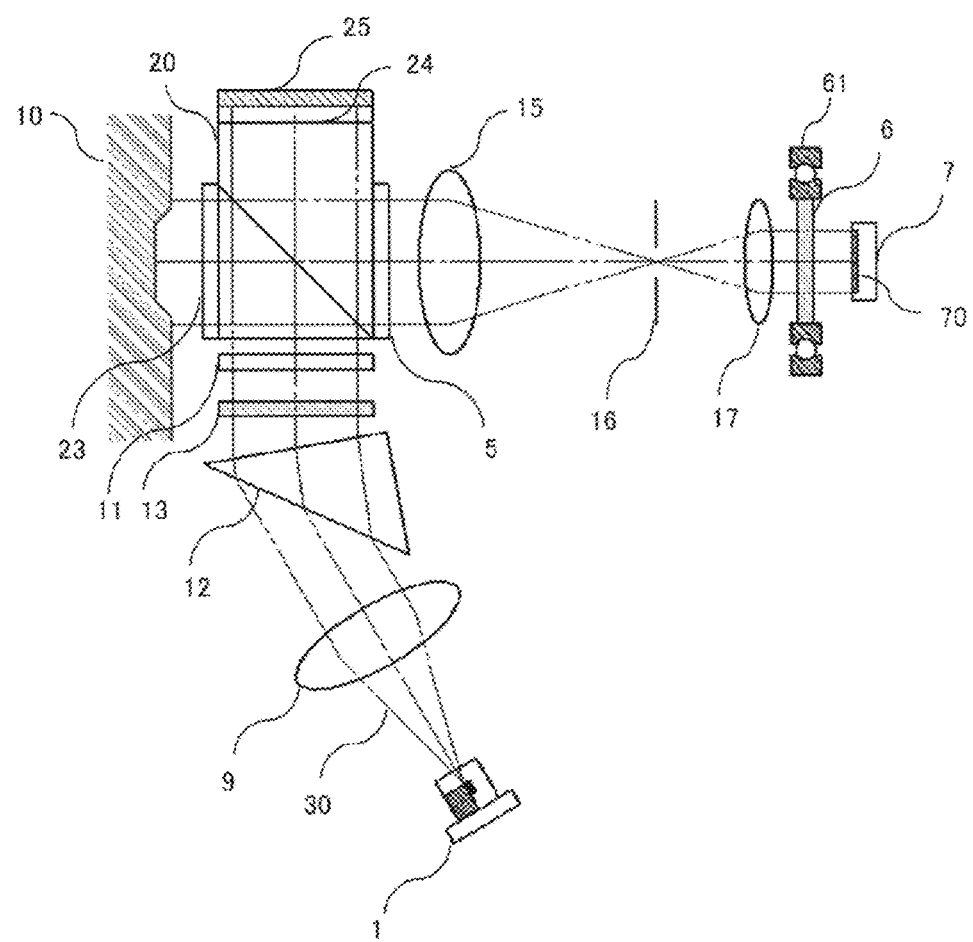
FIG. 9 is a second variation of the three-dimensional shape measuring device according to the present invention.

FIG. 9 is a second variation of this measuring device. The device illustrated in the figure is different from the device illustrated in FIG. 8 in a point that a telecentric optical system 15, 16, 17 is arranged on the imaging means 7 side. This variation can also acquire image information of the measurement target by the telecentric optical system and it is suitable for applications requiring not only the three-dimensional shape but also surface image information such as those mounted on a robot arm or the like, for example, so as to access a position of the measurement target.

As one example of the specific telecentric optical system, a relay lens 15 and a relay lens 17 are arranged between the quarter wave plate 5 on the imaging means side and the polarization element 6 for detecting relative phase differences. In order to improve measurement accuracy, an aperture 16 is preferably provided as appropriate between the relay lens 15 and the relay lens 17. The object light from the measurement target usually includes components in various directions but by setting an opening diameter of the aperture 16 as appropriate, only a component substantially the same as the reference light can be extracted in the object light and thus, unnecessary fine interference fringes which become noises can be prevented from being generated on the imaging area.

Magnification of the telecentric optical system may be selected as appropriate in accordance with the size of the imaging means 7. Moreover, a telecentric optical system having a variable zoom function may be arranged. Moreover, a both-side telecentric optical system is preferable. The both-side telecentric optical system is an optical system having both an entrance pupil and an exit pupil located in an infinite direction.

According to this variation, not only a hologram image of the measurement target is acquired in the three-dimensional shape measurement but an image of the measurement target is formed on the imaging area by the telecentric optical system and thus, a usual image (video) can be also imaged by the imaging means 7. As a light source for usual imaging, if the illumination light for illuminating the measurement target is used as it is, when observation is made while an observation position is being moved, an influence of the interference fringes is small, but in a static state, observation is made difficult due to the influence of the interference fringes. Thus, in observation, the half wave plate 11 for incident light is rotated so as to make the light amount of the reference light smaller than that when a hologram image is acquired or more preferably, the reference light is made minimum, and a video image is preferably acquired from the irradiation light to the measurement target. Moreover, since an effect as if a three-dimensional object is virtually moved to a vicinity of the imaging area occurs due to an optical action of the telecentric optical system, a high-frequency component from fine irregularity or the like can be also measured with good resolution by digital holography.

Moreover, the video acquired by the imaging means can be used as supplementary information for control and a measurement result of the robot arm on which this measuring device is mounted. Moreover, since a CCD camera for operating the robot arm does not have to be provided separately, a simple measurement system can be configured.

Figure 10:
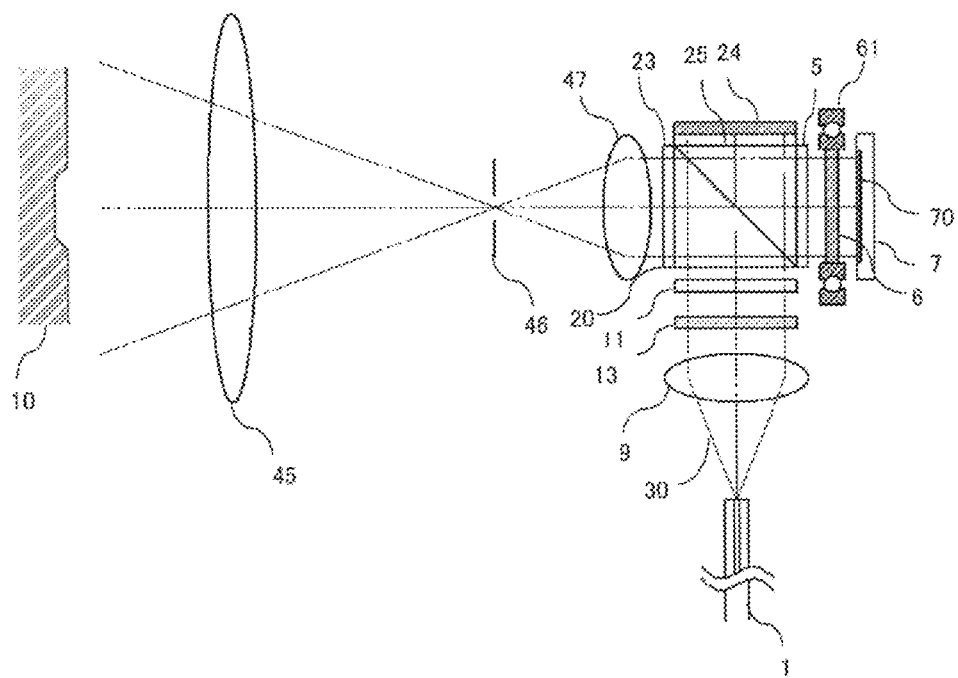
FIG. 10 is a third variation of the three-dimensional shape measuring device according to the present invention.

FIG. 10 is a third variation of this measuring device. The device illustrated in the figure is different from the device illustrated in FIG. 8 in a point that a telecentric optical system is arranged on the object side. This variation is preferable for measurement of a relatively large measurement target (approximately 10 to 30 cm, for example). In this variation, since an optical path difference between the object light and the reference light is large, it is preferable that a gas laser or a solid laser with a long coherent length is used and the laser beam is supplied to the optical unit by an optical fiber.

As the telecentric optical system, specifically, a relay lens 45, an aperture 46, and a relay lens 47 are arranged between the measurement target 10 and the quarter wave plate 23. As described above, the measurement accuracy can be improved by the aperture 46. Moreover, the both-side telecentric optical system may be configured, but an image-side telecentric optical system is preferably employed. The image-side telecentric optical system is an optical system in which an exit pupil is located in an infinite direction. In the image-side telecentric optical system, even if zoom magnification is set large, a lens with a relative small aperture can be used for the relay lens on the objective side. Moreover, in the image-side telecentric optical system, since the object light reaching the imaging area from the optical unit becomes perpendicular to the optical axis anywhere on the imaging area, a large crossing angle is not generated with the reference light incident perpendicularly. Thus, even if the measurement target is large, the three-dimensional shape measurement with high accuracy can be realized.

The laser beam supplied from the light source is irradiated to the optical unit 2 through an optical fiber and a collimator lens. The illumination light is irradiated to the measurement target through the telecentric optical system, and the object light reflected from the measurement target is incident on the optical unit 2 through the telecentric optical system again. In FIG. 10, too, a video of the measurement target can be acquired by the imaging means 7 by a zoom function of the telecentric optical system. In FIG. 10, unlike the device in FIG. 9, it has a feature that only an imaging target is subjected to reduced-size projection by the imaging means 7 and a pattern of the reference light is not reduced. If the measurement target is large, interference fringes of the object light reduced by the zoom function of the telecentric optical system and the reference light are recorded on the imaging area. Since the reference light does not go through the telecentric optical system and is not reduced, an order of an interval of the interference fringes is not changed. Thus, when the telecentric optical system in FIG. 10 is employed, too, a large measurement target can be sampled without changing a pixel pitch of the imaging element.

Figure 11:
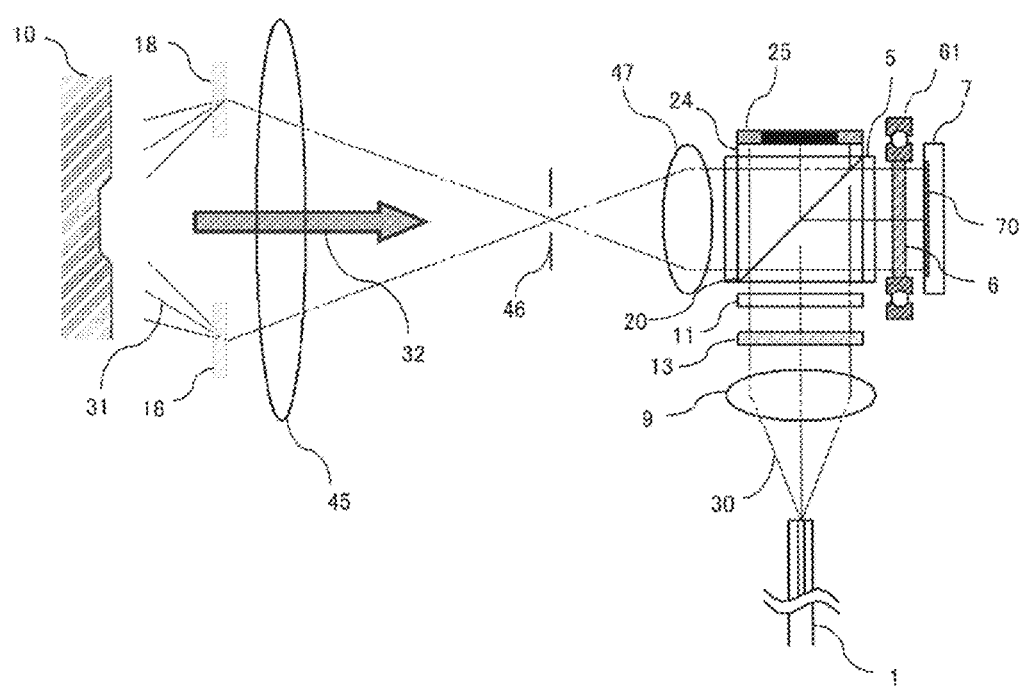
FIG. 11 is a fourth variation of the three-dimensional shape measuring device according to the present invention.
Figure 12:
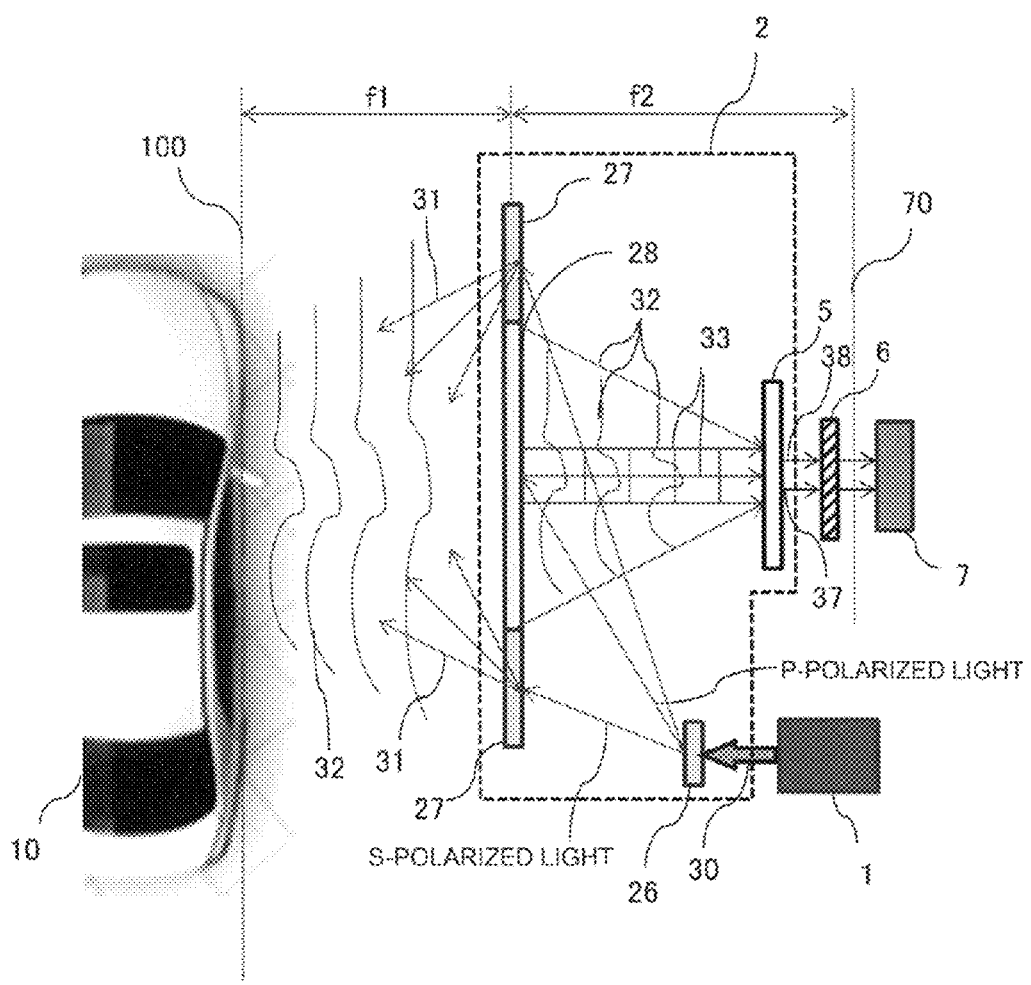
FIG. 12 is a fifth variation of the three-dimensional shape measuring device according to the present invention.

FIG. 11 is a fourth embodiment of this measuring device. The device illustrated in the figure is different from the device illustrated in FIG. 10 in a point that the polarization beam splitter 20 is configured such that the S-polarized light is reflected as the reference light to the imaging means 7 side, and the P-polarized light transmitted through the polarization beam splitter 20 is made into the illumination light by the reflective element 25 having an annular reflection surface, and illumination-light diffusing means 18 is provided in the vicinity of the measurement target. When reflectance of the surface of the measurement target is high or inclination is large, if the illumination light is irradiated perpendicularly to the measurement target, the reflected object light might be largely deviated from the optical path, which makes measurement impossible in some cases. In this point, according to the device in FIG. 11, since diffused illumination light from a diagonal direction is used by the illumination-light diffusing means 18, this variation is suitable for measurement of a measurement target with high reflectance (a mirror surface, for example) and a measurement target including relatively large inclination.

The laser beam 30 incident on the optical unit 2 is split by the polarization beam splitter 20 into two luminous fluxes, that is, the P-polarized light and the S-polarized light. The S-polarized light is reflected toward the imaging means 7 as the reference light. On the other hand, the P-polarized light is transmitted through the boundary surface (reflection surface) of the polarization beam splitter 20 as the illumination light, passes through the quarter wave plate 24, and is reflected by the reflective element 25 again toward the boundary surface (reflection surface) of the polarization beam splitter 20. The reflective element 25 is a mirror having an annular reflection surface, and its center part is configured so as not to reflect light. As a result, the illumination light becomes annular light. Since the illumination light has passed through the quarter wave plate 24 twice, it becomes the S-polarized light and is reflected on the boundary surface of the polarization beam splitter 20 toward the measurement target 10 and is incident on the telecentric optical system.

The annular illumination light transmitted through the relay lens 45 is diffused toward the center part of the measurement target by the illumination-light diffusing means 18 arranged at an appropriate position on the objective side of the relay lens 45. The illumination-light diffusing means 18 may be configured by an HOE, a Fresnel lens, a diffuser or the like. In this case, the illumination light becomes illumination like dark-field illumination in a microscope. Light in the optical-axis direction diffusely reflected on the surface of the measurement target is incident on the polarization beam splitter 20 as the object light through the telecentric optical system. The object light of the S-polarized light is transmitted through the boundary surface of the polarization beam splitter and is irradiated to the imaging means 7.

As described above, in this variation, since the illumination light is not irradiated substantially perpendicularly to the measurement target but the diffused illumination light is irradiated from the diagonal direction, at least a part of the object light reflected by the measurement target can be taken in. Thus, according to this variation, even if the measurement target is an object with high reflectance, precise three-dimensional shape measurement of the measurement target is possible unlike the prior-art optical system. Moreover, even if the measurement target has large inclination, the inclination of the measurement target can be measured in a contactless manner. Moreover, even if the measurement target has a surface which scatters light, by irradiating with random diffused illumination at various incident angles from the diagonal direction, at least a part of the object light generated by being diffused on the surface of the measurement target has a component substantially coaxial to the reference light. Thus, three-dimensional shape measurement of the measurement target having a surface scattering light which has been difficult to be measured can be realized.

FIG. 12 is a fifth variation of this measuring device. In this variation, the optical unit 2 is configured by a holographic optical element. The optical unit 2 includes an HOE 26 for splitting luminous flux, an HOE 27 for illumination, and an HOE 28 for interference. A distance f1 between the measurement target area 100 and the HOE 27 for illumination as well as the HOE 28 for interference and a distance f2 between the HOE 28 for interference and the imaging area 70 may be set as appropriate in accordance with modes of the measuring device and the measurement target. Each HOE may be also set as appropriate in accordance with modes of the measuring device and the measurement target.

The HOE 26 for splitting luminous flux splits the laser beam 30 supplied from the laser light source 1 into the P-polarized light and the S-polarized light, emits one (the S-polarized light, for example) toward the HOE 27 for illumination and emits the other (the P-polarized light, for example) toward the HOE 28 for interference.

The HOE 27 for illumination is provided around the HOE 28 for interference and generates the diffused illumination light 31 irradiating the measurement target 10 from around by diffusing the illumination light of the S-polarized light. The HOE 28 for interference transmits the object light 32 of the S-polarized light and converges it toward the imaging means 7 and reflects the reference light 33 of the P-polarized light toward the imaging means 7.

According to the device in FIG. 12, the laser beam supplied from the laser light source 1 is split by the HOE 26 for splitting luminous flux into the S-polarized light and the P-polarized light, and the S-polarized light is emitted toward the HOE 27 for illumination, while the P-polarized light is emitted toward the HOE 28 for interference. The S-polarized light incident on the HOE 27 for illumination is irradiated as the diffused illumination light 31 toward the measurement target 10 diagonally. The object light 32 of the S-polarized light reflected from the measurement target transmits through the HOE 28 for interference and is focused to the imaging means 7. On the other hand, the P-polarized light emitted toward the HOE 28 for interference is reflected by the HOE 28 for interference as the reference light 33 toward the imaging means 7. The reference light may be focused as appreciate by the HOE 28 for interference. After that, a hologram having a relative phase difference between the object light and the reference light is imaged by the quarter wave plate 5 for circularly polarized light conversion and the polarization element 6 for detecting relative differences. Moreover, in the device exemplified in FIG. 12, a telecentric optical system configured by a relay lens or an HOE and an aperture and the like may be arranged between the optical unit and the measurement target and/or the imaging means.

The configuration of each device described above is one embodiment and is not limited to each device but can be applied to each other. Moreover, the measurement target is reduced and its image is imaged by the telecentric optical system, but a hologram image may be imaged by enlarging the measurement target for micro measurement targets. As such an application, it can be used for a microscope and the like.

EXAMPLE

An example of the three-dimensional shape measuring device and the method for measuring the three-dimensional shape of the present invention will be described.

Figure 13:
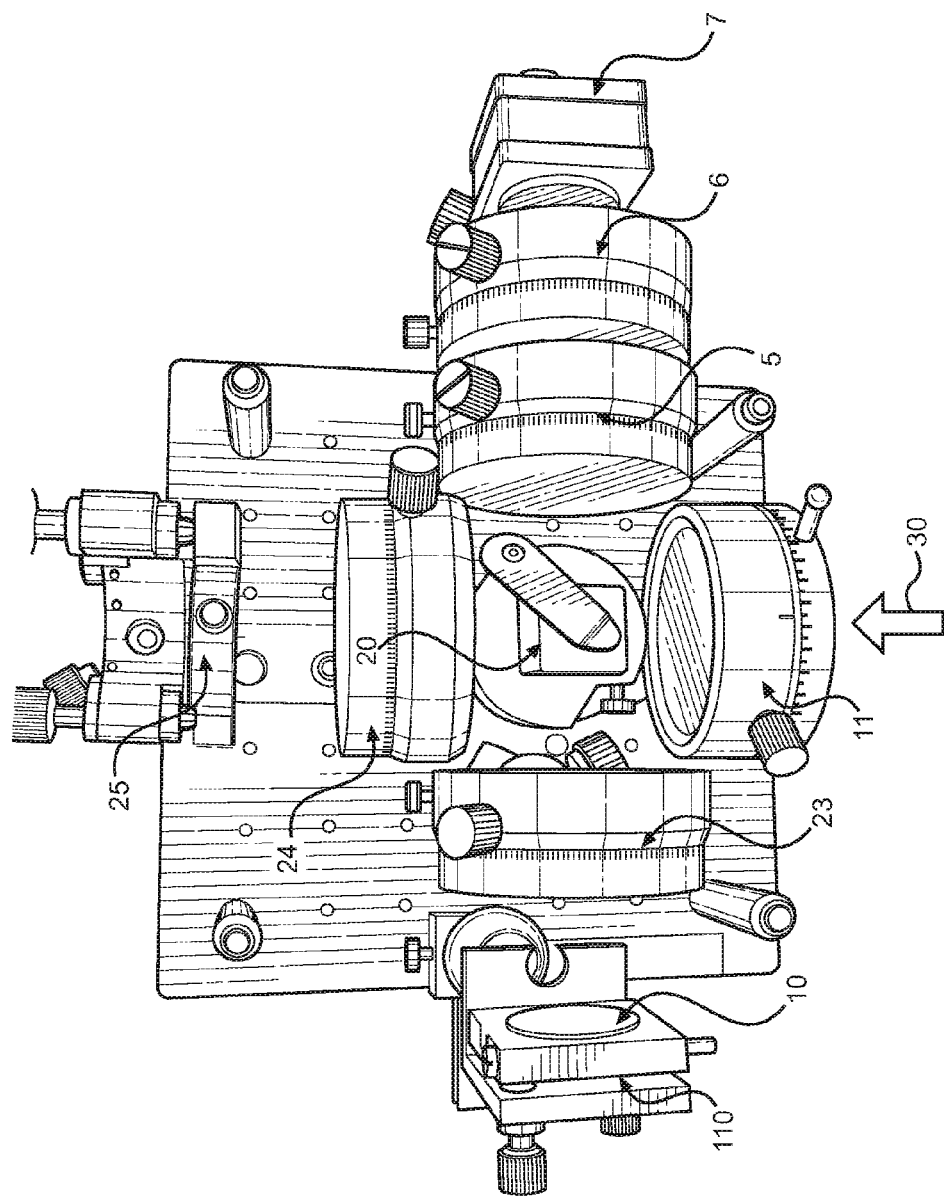
FIG. 13 is an example of the three-dimensional shape measuring device.

FIG. 13 is a photo of this measuring device. This measuring device comprises a laser light source (not shown), the half wave plate 11, the polarization beam splitter 20, the quarter wave plate 23, the quarter wave plate 24, the mirror 25, the quarter wave plate 5 for circularly polarized light conversion, the polarization element 6 for relative phase differences, a CCD camera 7, and a measurement target holder 110. The size of the entire device is approximately 250×250 [mm], which is small-sized compact. The laser light source used in this example was model No. LGK7654-8 (beam diameter φ1.9 mm, light emission wavelength 532 nm) by LASOS, and the imaging means was model No. DFK72BUC02 by IMAGING SOURCE (CMOS type, imaging size: 2048×1536 pixel, inter-element distance 4.4 μm).

First, a plano-convex lens was placed on the measurement target holder 110, images of four interference fringe patterns were imaged, and the information processing means took-in each of the interference fringe patterns (Step 202 in FIG. 6). FIG. 14(A) is a photo of a transparent plano-convex lens which is a measurement target and also illustrates a measurement range of 5×4 [mm].

Figure 16:
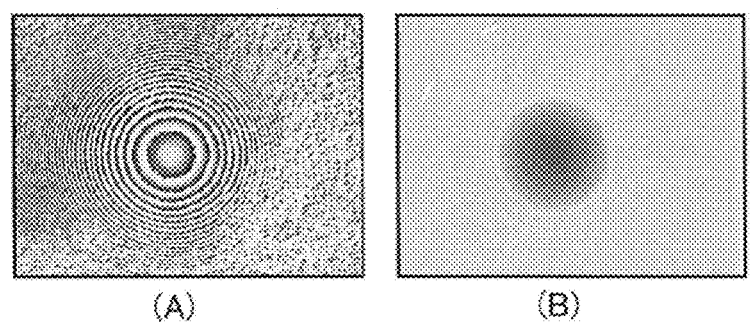
FIG. 16 is an explanatory view illustrating phase distribution of the plano-convex lens.
Figure 17:
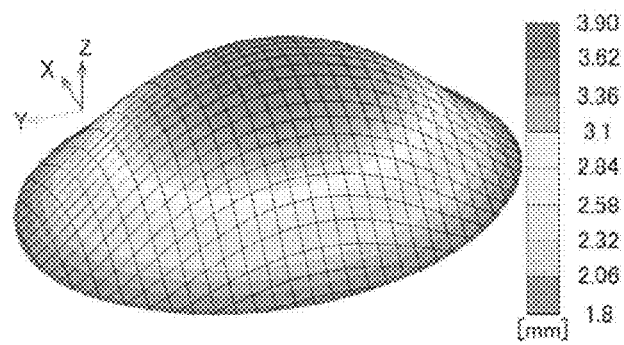
FIG. 17 is an explanatory view illustrating a three-dimensional shape of the plano-convex lens.
Figure 18:
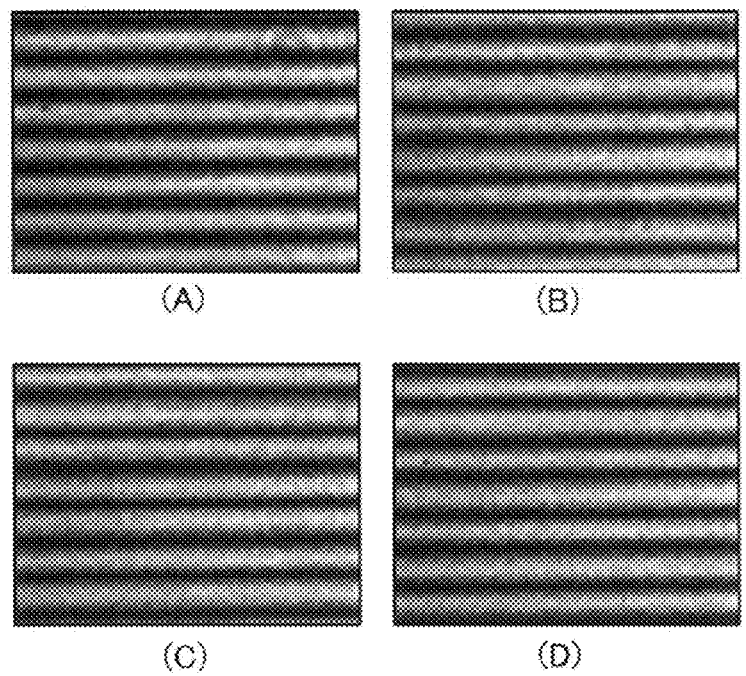
FIG. 18 is a photo of a hologram image by the planar mirror.

FIGS. 15(A), 15(B), 15(C), and 15(D) are interference fringe patterns when the rotation angles of the polarization element 6 for relative phase detection are α=0°, 45°, 90°, and 135°, respectively. The information processing means executed various types of processing on the basis of these interference fringe patterns and calculated phase distribution of the object light (Steps S204 to S208 in FIG. 6). FIG. 16(A) is the phase distribution of the calculated object light. Subsequently, the coupling processing was executed (Step S210 in FIG. 6), the phase distribution of the object light after the coupling processing was obtained. FIG. 16(B) is phase distribution of the object light after the coupling processing, and a phase amount is indicated by contrasting. Lastly, the three-dimensional shape of the measurement target was reproduced by using the interference surveying method (Step S212 in FIG. 6). FIG. 17 shows the reproduced three-dimensional shape of the transparent plano-convex lens.

Figure 14:
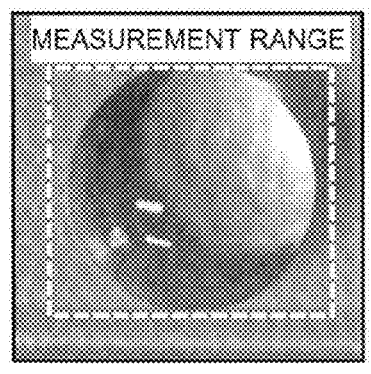
FIG. 14 is a photo of a plano-convex lens and a planar mirror.
Figure 14:
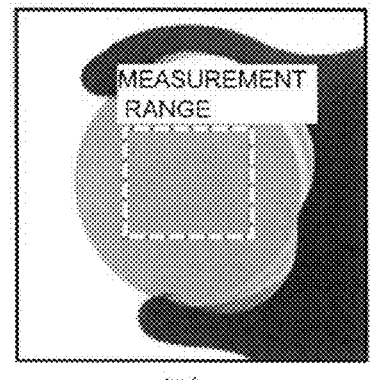
Figure 15:
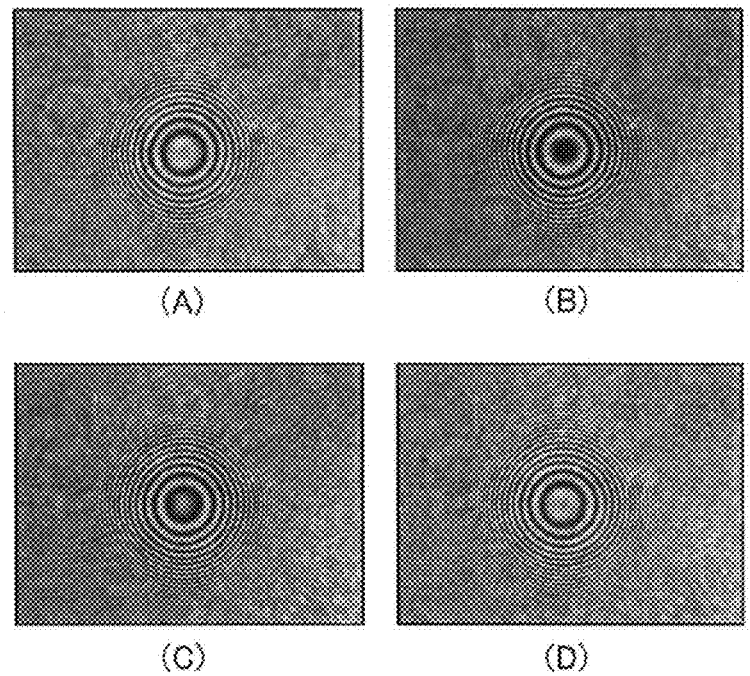
FIG. 15 is a photo of a hologram image by the plano-convex lens.

Similarly to the three-dimensional shape measurement of the plano-convex lens, the three-dimensional shape measurement was also conducted for a total reflection planar mirror. FIG. 14 (B) is a planar mirror which is a measurement target and also illustrates a measurement range of 5×4 [mm] at the substantially center of the measurement target.

Figure 19:
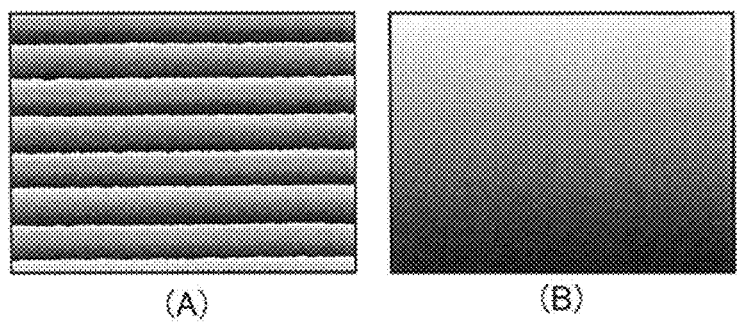
FIG. 19 is an explanatory view illustrating phase distribution of the planer mirror.
Figure 20:
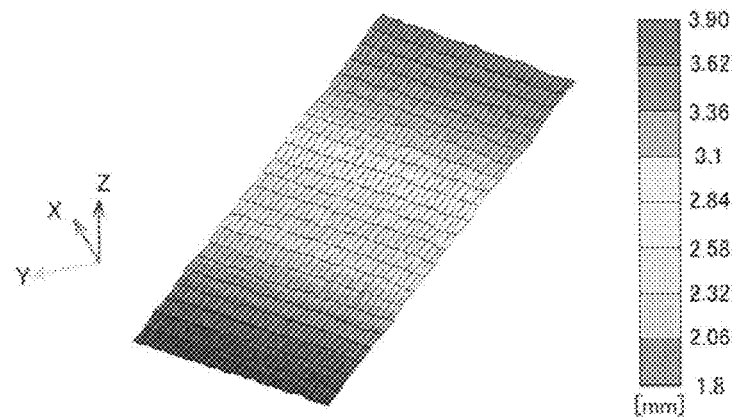
FIG. 20 is an explanatory view illustrating a three-dimensional shape of the planar mirror.

FIGS. 18(A), 18(B), 18(C), and 18(D) are interference fringe patterns of the planar mirror when the rotation angles of the polarization element 6 for relative phase detection are α=0°, 45°, 90°, and 135°, respectively. FIG. 19(A) is calculated phase distribution of the object light from the planar mirror. FIG. 19 (B) is phase distribution of the object light from the planar mirror after the coupling processing. FIG. 20 is a reproduced three-dimensional shape of the planar mirror.

Figure 21:
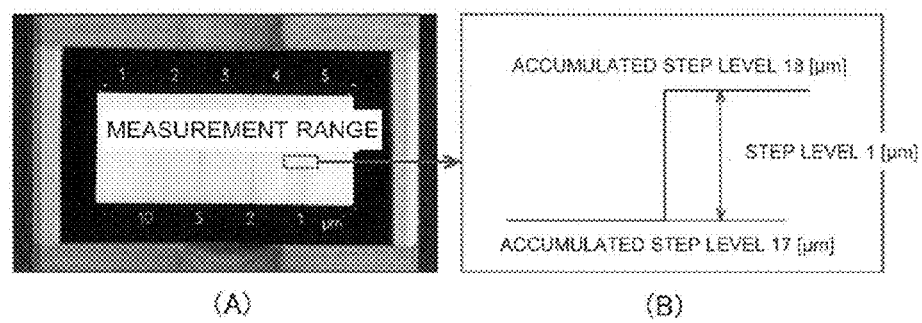
FIG. 21 is a photo of a stepped master which is the measurement target.

Moreover, as an example, a stepped master used for calibration of an optical measurement device or the like was measured. FIG. 21(A) is a photo of the stepped master of the measurement target, and this stepped master includes a step of 1 μm in a measurement range as illustrated in FIG. 21 (B). The stepped master used in this example is model No. "516-498 made of ceramics" of the 516 series by Mitsutoyo Corp. An image of this stepped master was imaged, and the three-dimensional shape was measured on the basis of the imaged hologram image. The measurement was made 10 times for confirmation of reproducibility.

Figure 22:
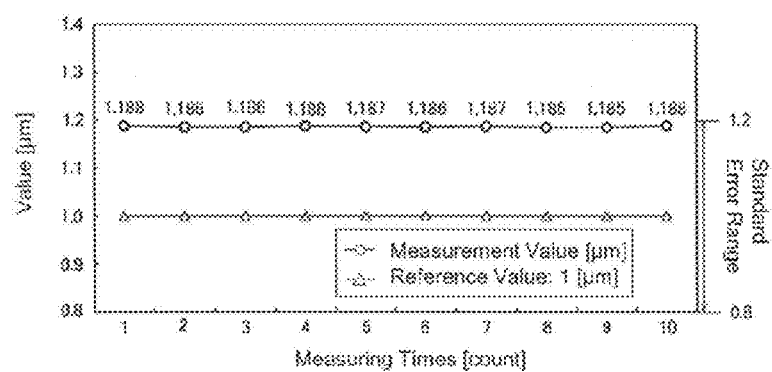
FIG. 22 is an explanatory view illustrating a measurement result of the stepped master.

FIG. 22 is a measurement result of the stepped master, and measurement values of the step for ten times are shown. According to the measurement result, an average error was 0.187 μm with respect to a reference value 1 μm of the stepped master. In this example, a general personal computer (processor: corei7 3.2 GHz, memory: 3 GB) was used as the information processing means. Processing time of all the steps of the three-dimensional shape measurement illustrated in FIG. 6 was approximately 1.5 seconds. If the measurement processing is executed in GPU, real-time three-dimensional shape measurement is also possible.

As described above, according to the present invention, since the relative phase differences between the object light and the reference light can be controlled by rotating the polarization element for detecting relative phase differences, a hologram image in a plurality of different phase states can be acquired. Particularly, by rotating the polarization element for detecting relative phase differences by 45° each, four types of hologram images can be imaged. Moreover, the measuring device of the present invention does not have to use a piezo element and thus, it is resistant against vibration and a low cost. Furthermore, by forming an integrated optical unit, its structure can be made small-sized, compact and simple and can be used while the device itself is moved as appropriate. Moreover, according to one aspect of the present invention, the three-dimensional shape measurement can be conducted for a transparent measurement target, a measurement target with total reflection, a measurement target having large inclination, and a measurement target having a surface scattering light.

REFERENCE NUMERALS 1 laser light source
2 optical unit
5 quarter wave plate for circularly polarized light conversion
6 polarization element for detecting relative phase difference
7 imaging means
8 information processing means
10 measurement target
11 half wave plate for incident light
20 polarization beam splitter
23 quarter wave plate for illumination light
24 quarter wave plate for reference light
25 reflective element
30 incident light (laser beam)
31 illumination light
35 object light
36 reference light
37 object light of first circularly polarized light
38 reference light of second circularly polarized light

The invention claimed is:

1. A three-dimensional shape measuring device comprises:
   a laser light source;
   an object-light optical system;
   a reference-light optical system;
   a polarization element for detecting relative phase differences; and
   imaging means, in which
   the object-light optical system allows object light generated by irradiating a measurement target with a circulatory diffused illumination light generated from a part of light irradiated from the laser light source to be incident on the polarization element for detecting relative phase differences in a first circularly polarized light state,
   the reference-light optical system generates reference light from the other part of the light irradiated from the laser light source and allows the reference light to be incident on the polarization element for detecting relative phase differences in a second circularly polarized light state in a direction opposite to the first circularly polarized light,
   the polarization element for detecting relative phase differences transmits a component of the object light of the first circularly polarized light in a polarization direction of the polarization element for detecting relative phase differences and a component of the reference light of the second circularly polarized light in the polarization direction of the polarization element for detecting relative phase differences,
   the imaging means images a hologram image generated by interference between the object light and the reference light transmitted through the polarization element for detecting relative phase differences, and
   wherein the device is configured such that relative phase differences between the object light and the reference light transmitted through the polarization element for detecting relative phase differences are changed by rotating the polarization direction of the polarization element for detecting relative phase differences and a plurality of the hologram images with different relative phase differences are acquired.

2. The three-dimensional shape measuring device according to claim 1, wherein
   an optical unit is configured so that the object-light optical system and the reference-light optical system are integrated.

3. The three-dimensional shape measuring device according to claim 2, wherein
   the optical unit is configured by a combination of a polarization beam splitter, a quarter wave plate, a reflective element.

4. The three-dimensional shape measuring device according to claim 3, wherein
   the polarization beam splitter has:
   a first surface on which the light irradiated from the laser light source is incident;
   a second surface facing the measurement target;
   a third surface faced with the polarization element for detecting relative phase differences; and
   a fourth surface faced with the reflective element, in which
   the quarter wave plate is provided each on the second surface, the third surface, and the fourth surface.

5. The three-dimensional shape measuring device according to claim 3, wherein the polarization beam splitter has an extended portion on one end thereof so that the optical-path length of the reference light becomes substantially equal to the optical-path length of the object light.

6. The three-dimensional shape measuring device according to claim 3, wherein
the reflective element has a surface substantially the same as the shape of the surface of the measurement target.

7. The three-dimensional shape measuring device according to claim 2, wherein
the optical unit is configured by a holographic optical element.

8. The three-dimensional shape measuring device according to claim 1, wherein
a telecentric optical system is provided between the optical unit and the measurement target.

9. The three-dimensional shape measuring device according to claim 1, wherein
the optical unit has diffusing means for diffusing and irradiating a circulatory illumination light to the measurement target.

10. The three-dimensional shape measuring device according to claim 1, wherein
the telecentric optical system is provided between the optical unit and the imaging means.

11. The three-dimensional shape measuring device according to claim 1, wherein
means capable of image processing is provided, and
phase distribution of the object light from the measurement target is calculated from the plurality of hologram images with different relative phase differences so as to reproduce a three-dimensional shape of the measurement target.

12. A method for acquiring a hologram image, wherein
object light generated by irradiating a measurement target with a circulatory diffused illumination light generated from a part of light irradiated from the laser light source is converted to a first circularly polarized light,
reference light generated from the other part of the light irradiated from the laser light source is converted to a second circularly polarized light in a direction opposite to the first circularly polarized light,
the object light of the first circularly polarized light and the reference light of the second circularly polarized light are made incident on a polarization element for detecting relative phase differences which is rotatably configured, a component of the object light of the first circularly polarized light in a polarization direction of the polarization element for detecting relative phase differences and a component of the reference light of the second circularly polarized light in the polarization direction of the polarization element for detecting relative phase differences are transmitted, and a hologram image generated by interference between the object light and the reference light transmitted through the polarization element for detecting relative phase differences is acquired,
relative phase differences between the object light and the reference light transmitted through the polarization element for detecting relative phase differences are changed by rotating the polarization direction of the polarization element for detecting relative phase differences so that hologram images with different relative phase differences generated by interference between the object light and the reference light transmitted through the polarization element for detecting relative phase differences are acquired.

13. The method for acquiring a hologram image according to claim 12, wherein
circulatory illumination light is generated, and
the circulatory illumination light is diffused and irradiated to the measurement target.

14. The method for acquiring a hologram image according to claim 12, wherein
a telecentric optical system through which at least the object light is transmitted is arranged so that image information of the measurement target is acquired together with the hologram image.

15. The method for acquiring a hologram image according to claim 14, wherein
when the image information of the measurement target is to be acquired, a light amount of the reference light is lowered as compared with acquirement of the hologram image.

16. A method for measuring a three-dimensional shape, wherein
phase distribution of object light from the measurement target is calculated from a plurality of hologram images with different relative phase differences acquired by the method according to claim 12, so as to reproduce a three-dimensional shape of the measurement target.

* * * * *